Jan. 26, 1965  H. G. HENRICKSON  3,167,044
FORMING APPARATUS

Filed April 14, 1958  17 Sheets-Sheet 1

Fig-1-

INVENTOR
HENRY G. HENRICKSON
BY James E. Toomey
ATTORNEY

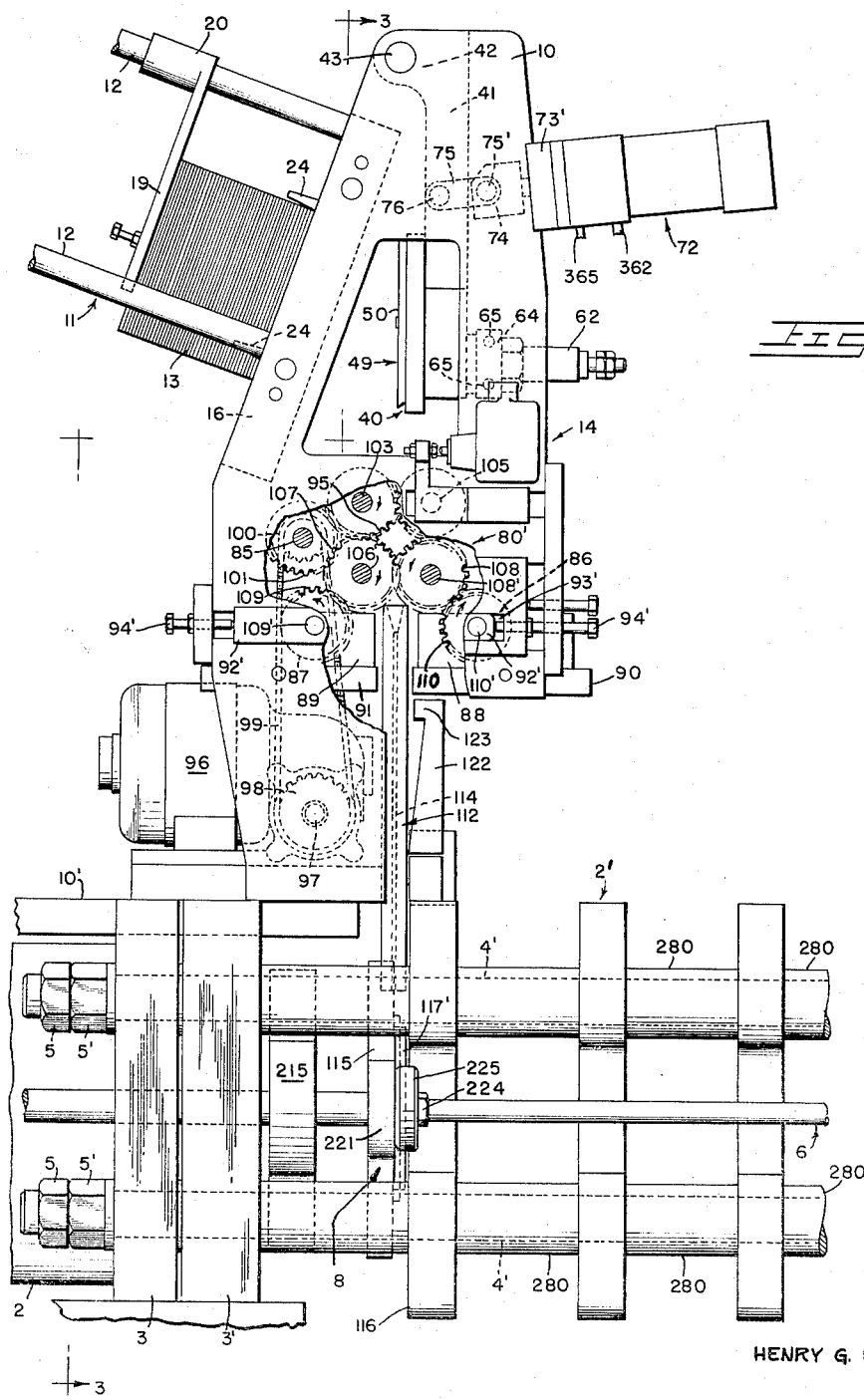

Jan. 26, 1965
H. G. HENRICKSON
3,167,044
FORMING APPARATUS
Filed April 14, 1958
17 Sheets-Sheet 3
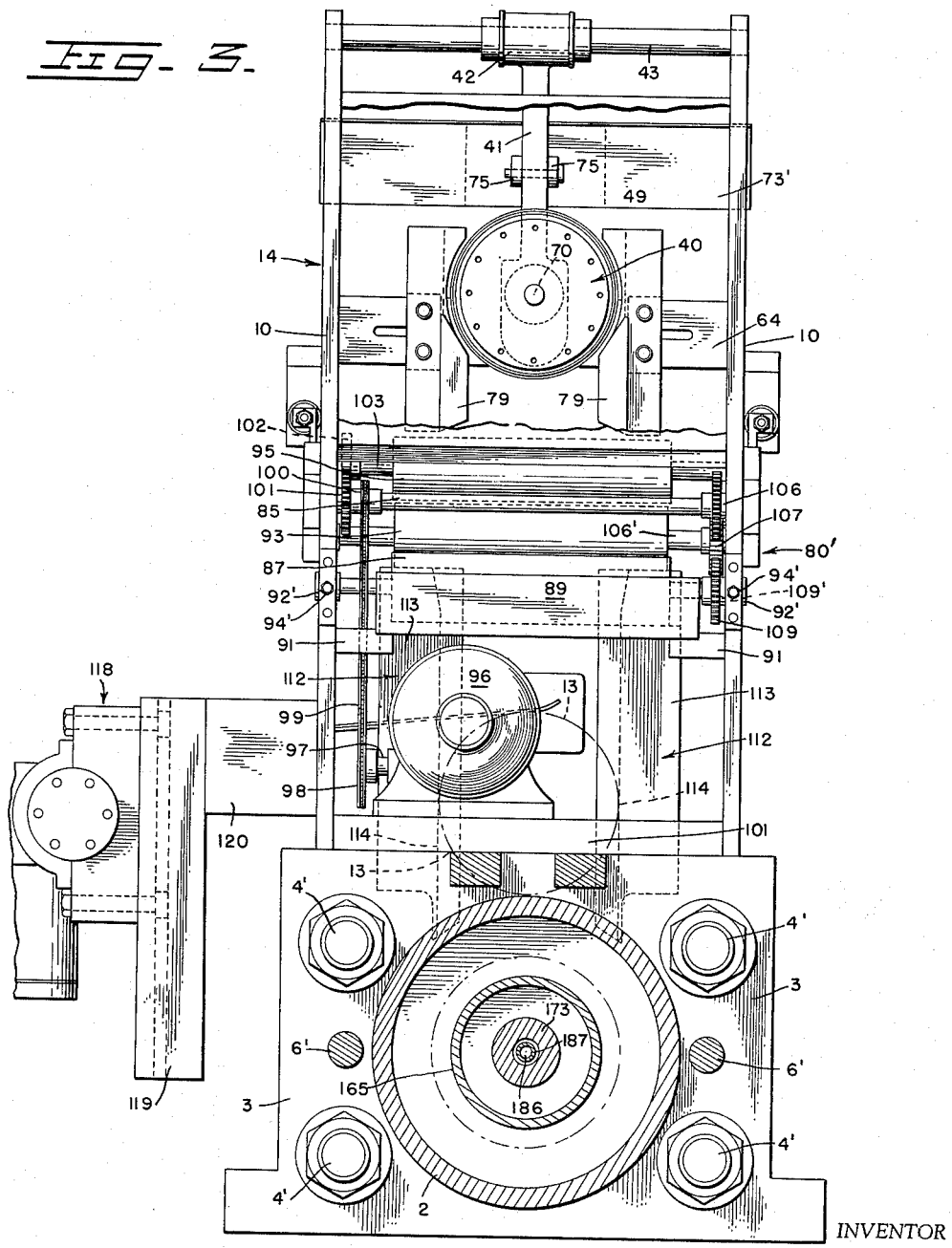
INVENTOR
HENRY G. HENRICKSON
BY James E. Toomey
ATTORNEY

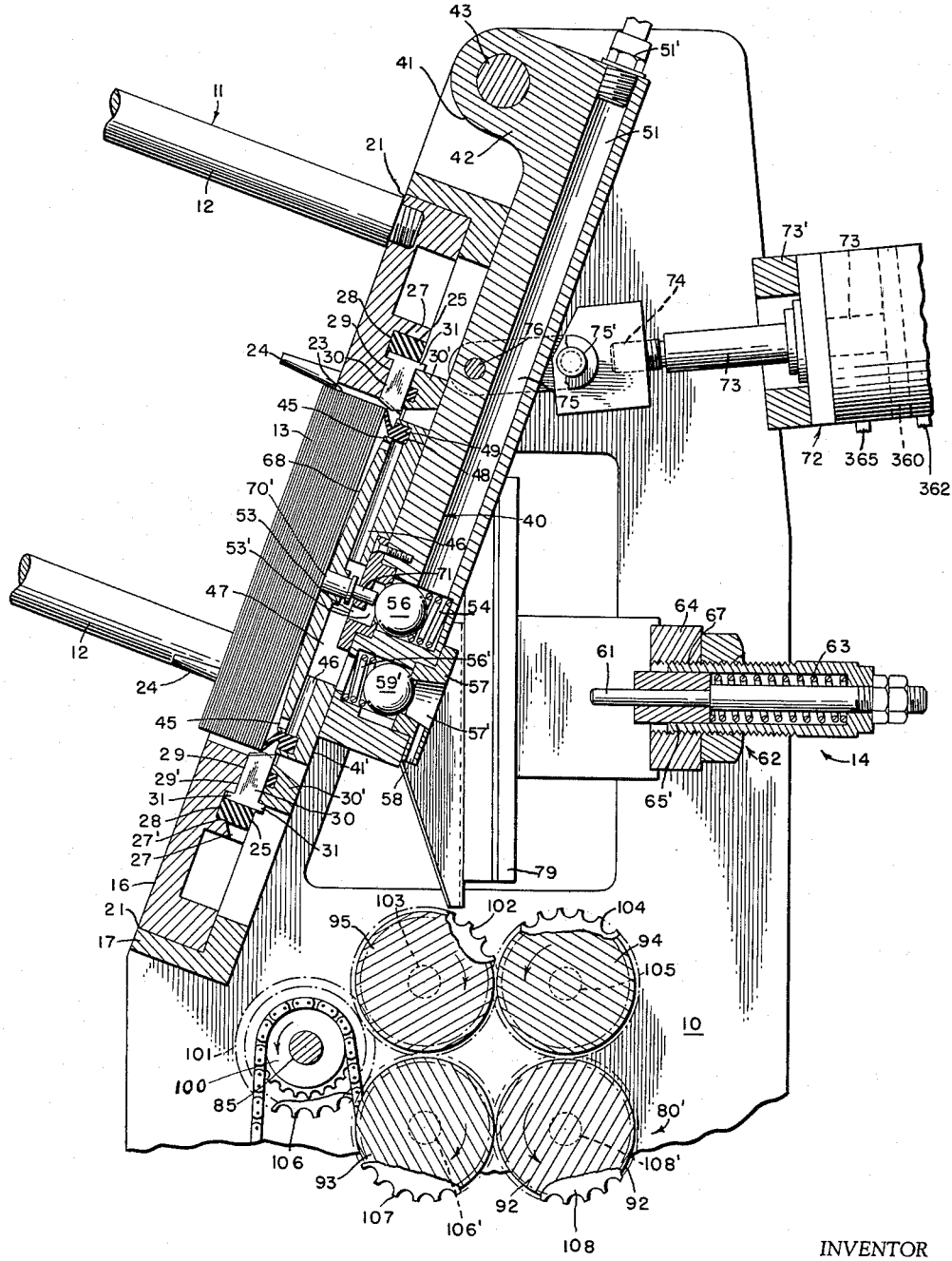

Jan. 26, 1965 H. G. HENRICKSON 3,167,044
FORMING APPARATUS
Filed April 14, 1958 17 Sheets-Sheet 5

INVENTOR
HENRY G. HENRICKSON
BY James E. Toomey
ATTORNEY

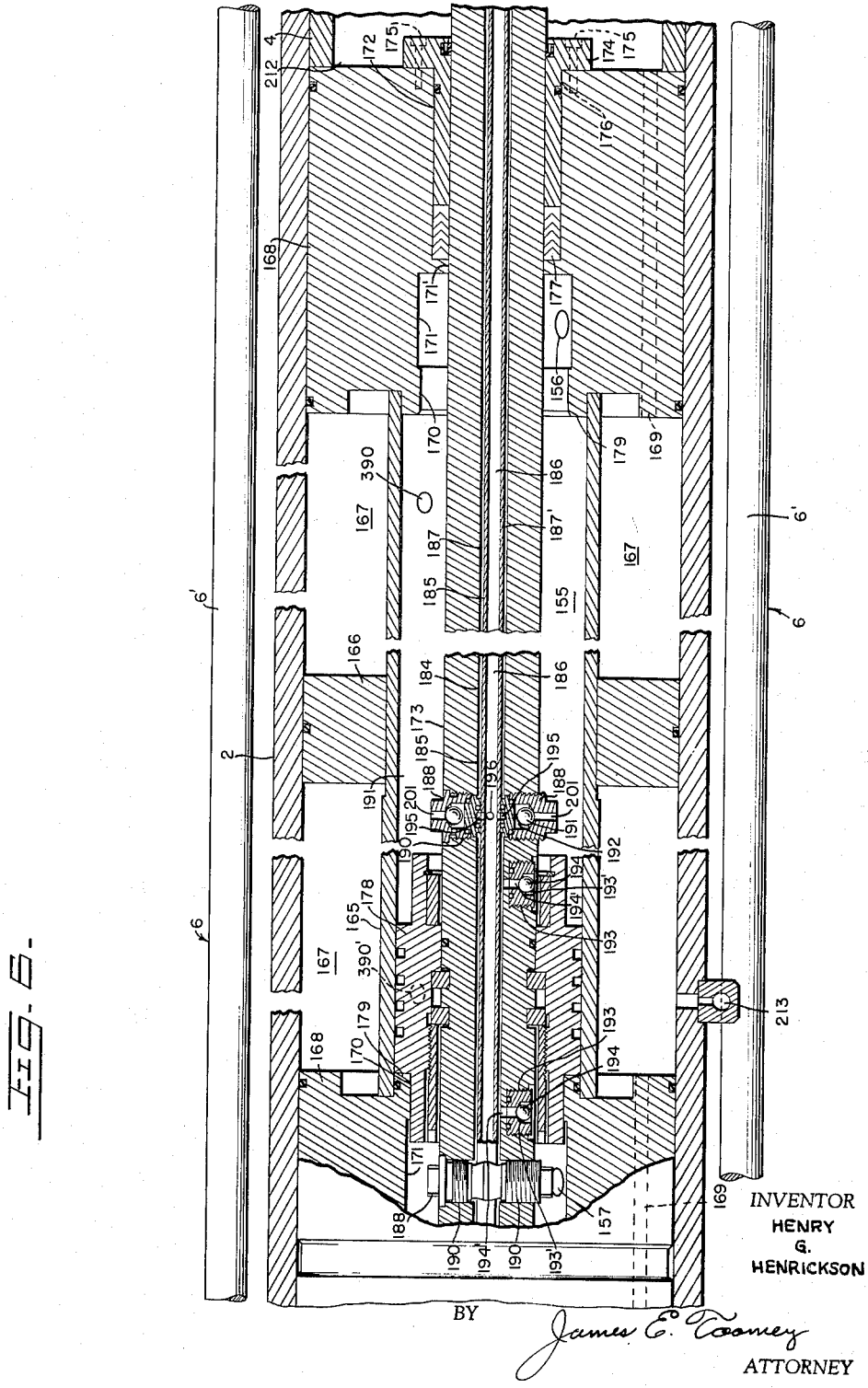

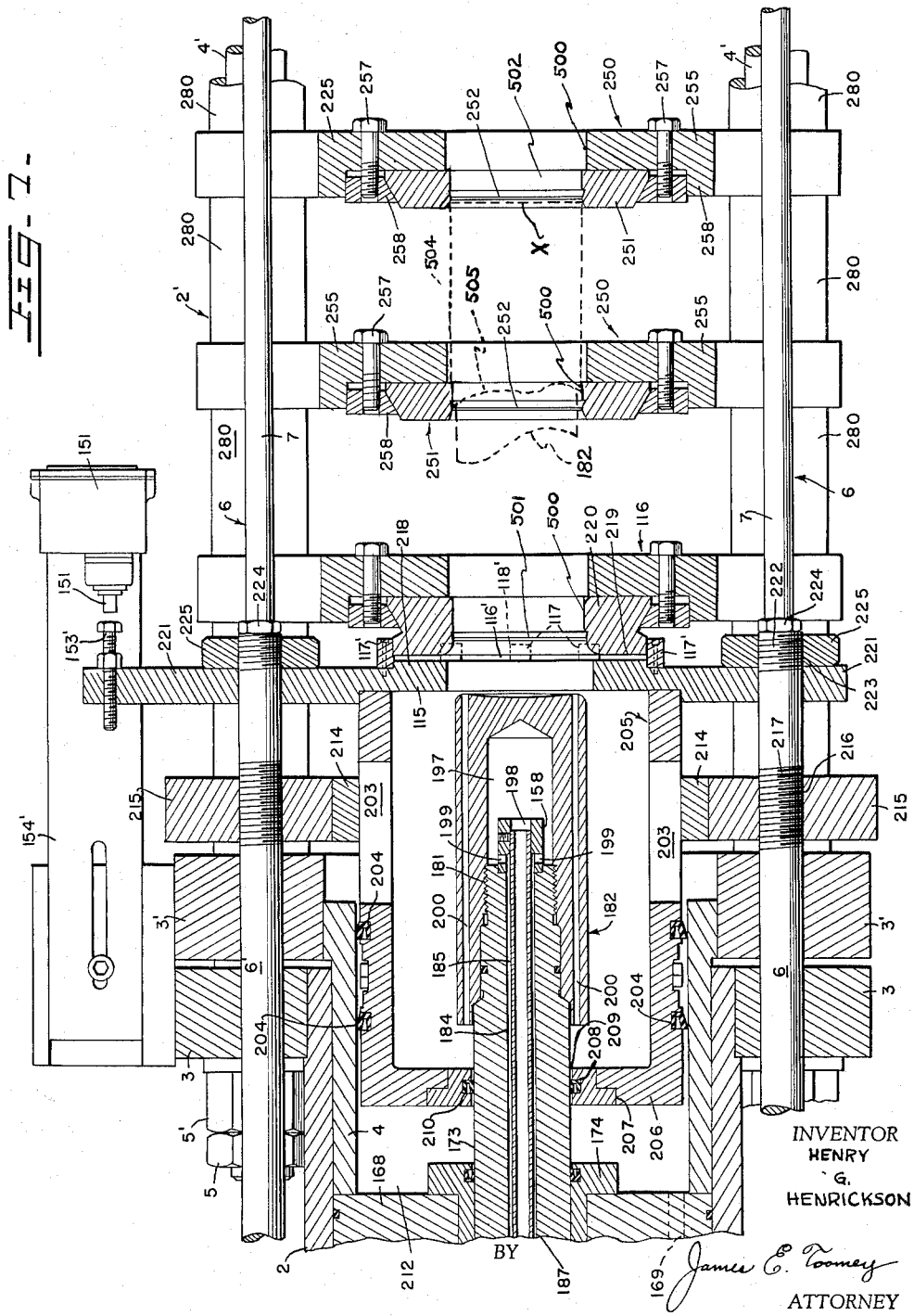

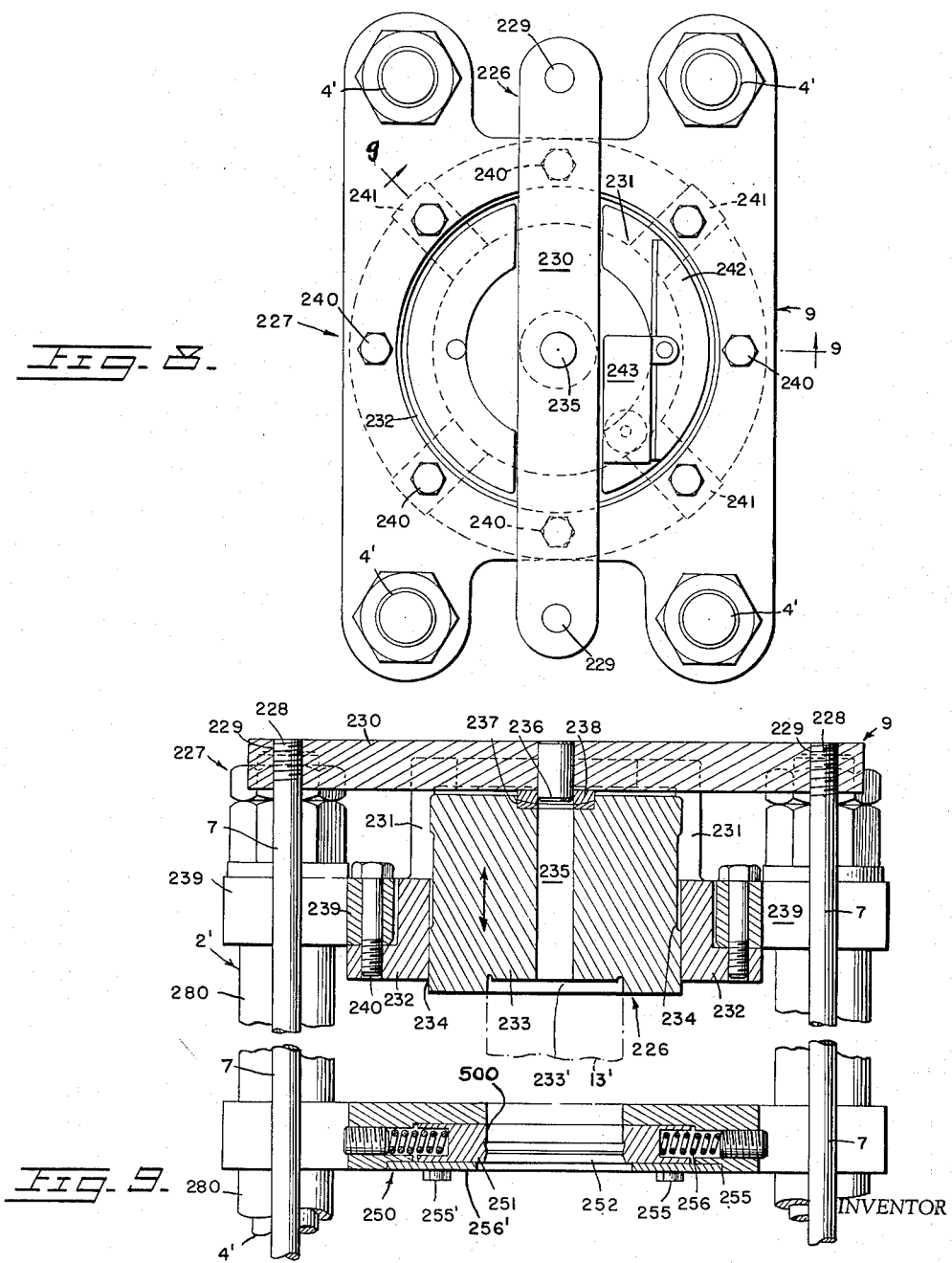

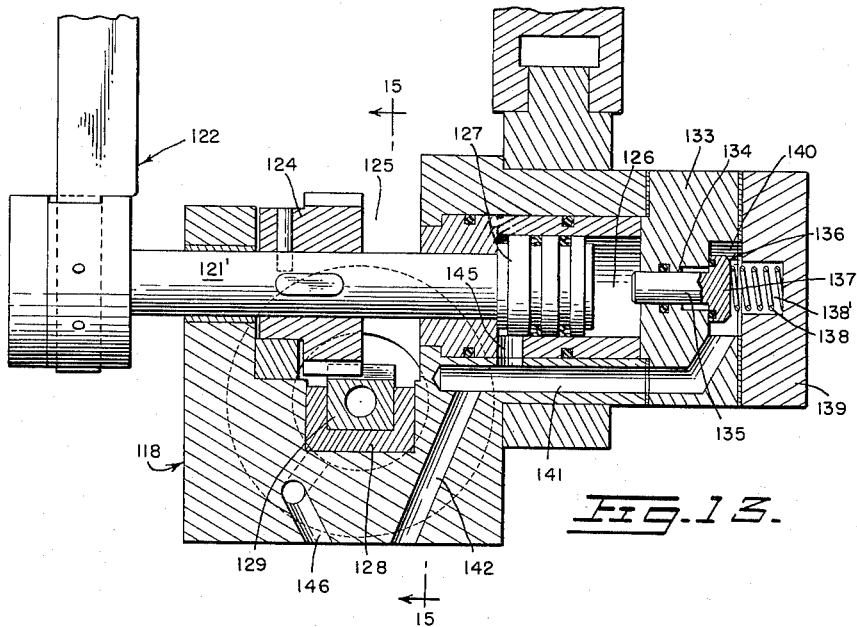
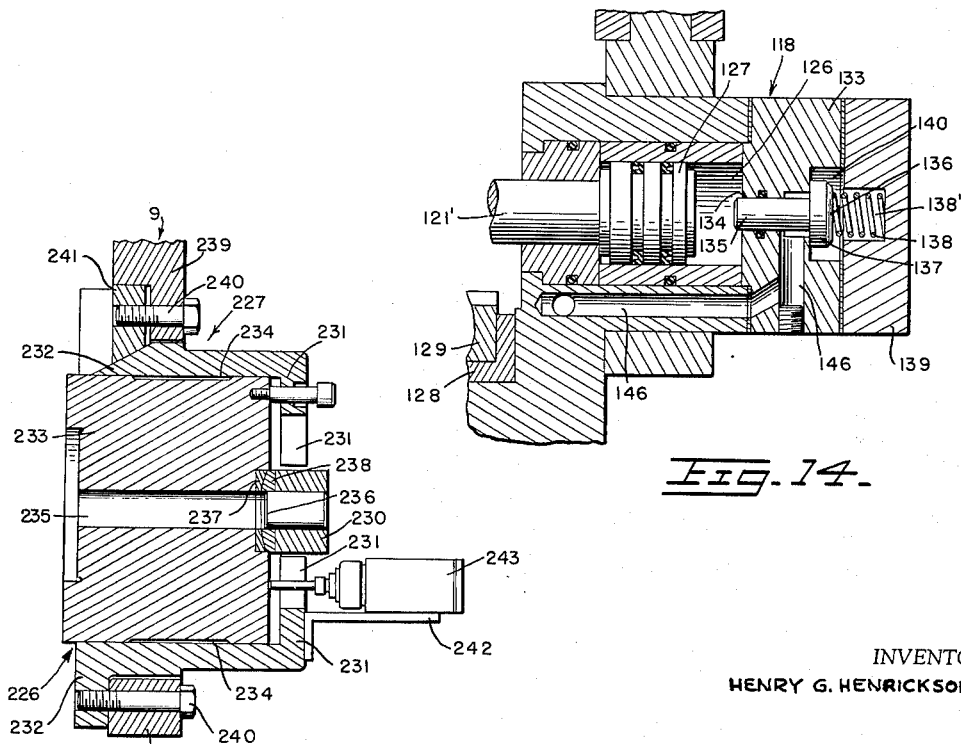

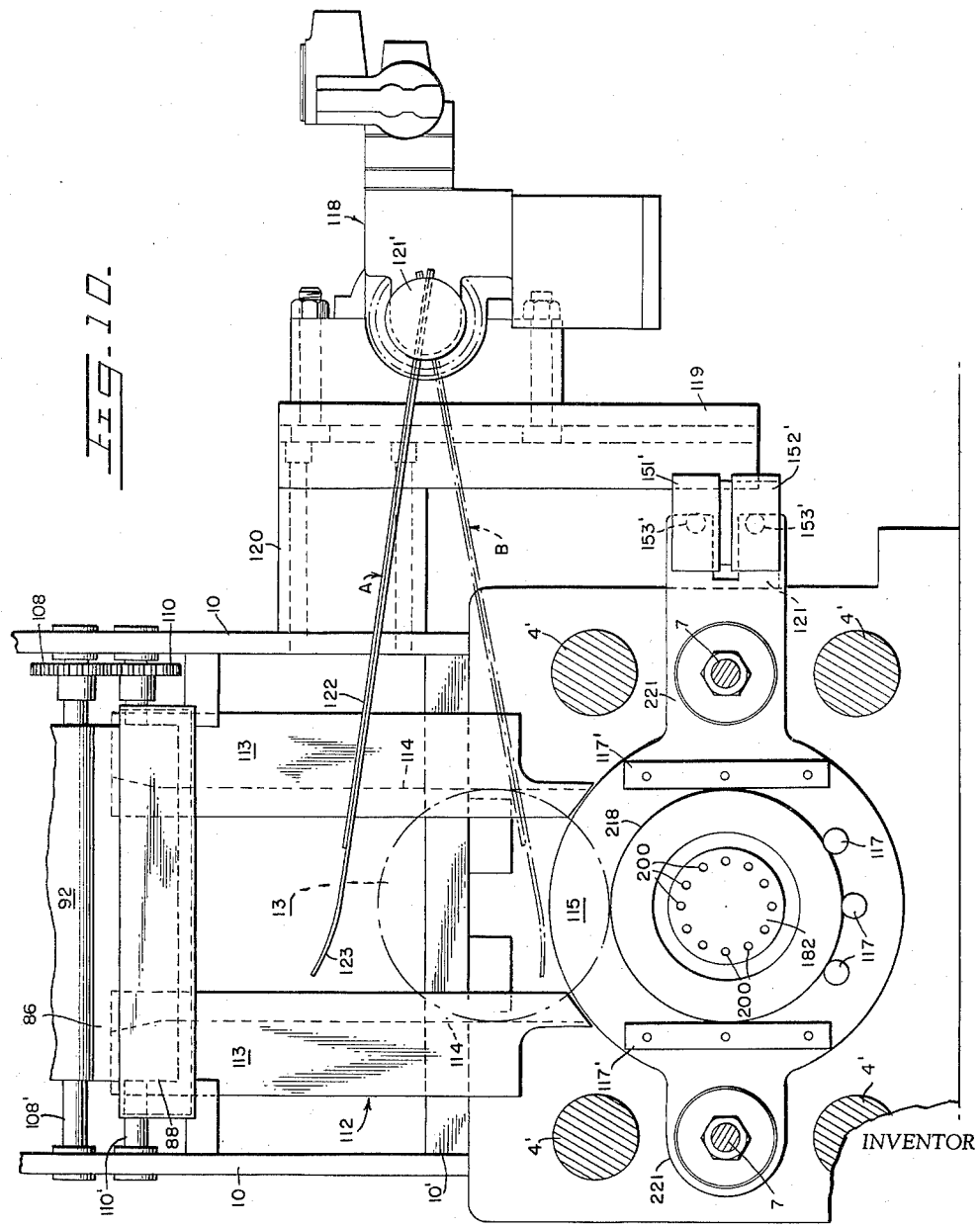

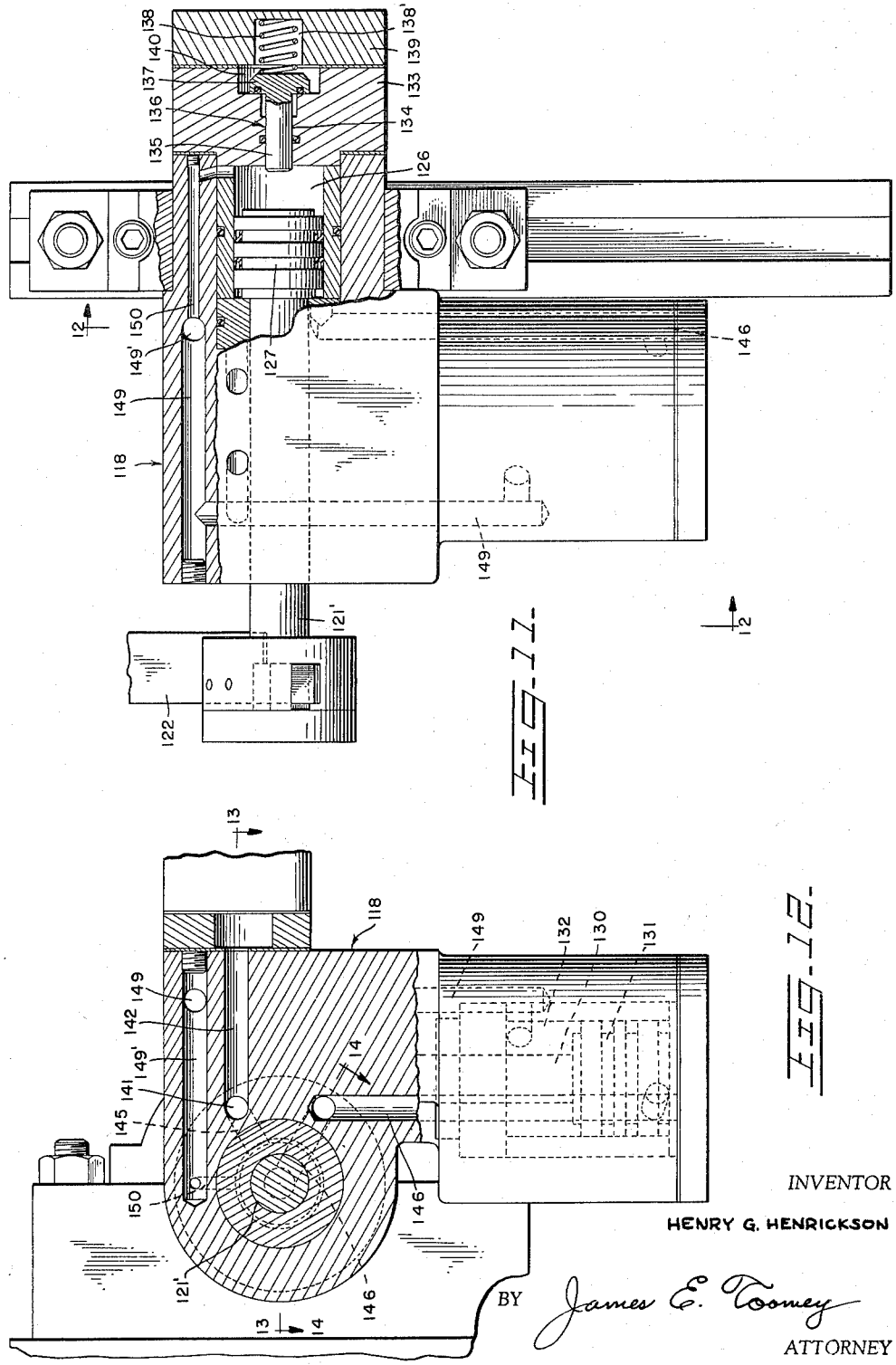

Jan. 26, 1965  H. G. HENRICKSON  3,167,044
FORMING APPARATUS

Filed April 14, 1958  17 Sheets-Sheet 12

INVENTOR
HENRY G. HENRICKSON
BY James E. Toomey
ATTORNEY

Jan. 26, 1965   H. G. HENRICKSON   3,167,044
FORMING APPARATUS
Filed April 14, 1958   17 Sheets-Sheet 13

INVENTOR
HENRY G. HENRICKSON

BY *James E. Toomey*
ATTORNEY

Jan. 26, 1965  H. G. HENRICKSON  3,167,044
FORMING APPARATUS
Filed April 14, 1958  17 Sheets-Sheet 14
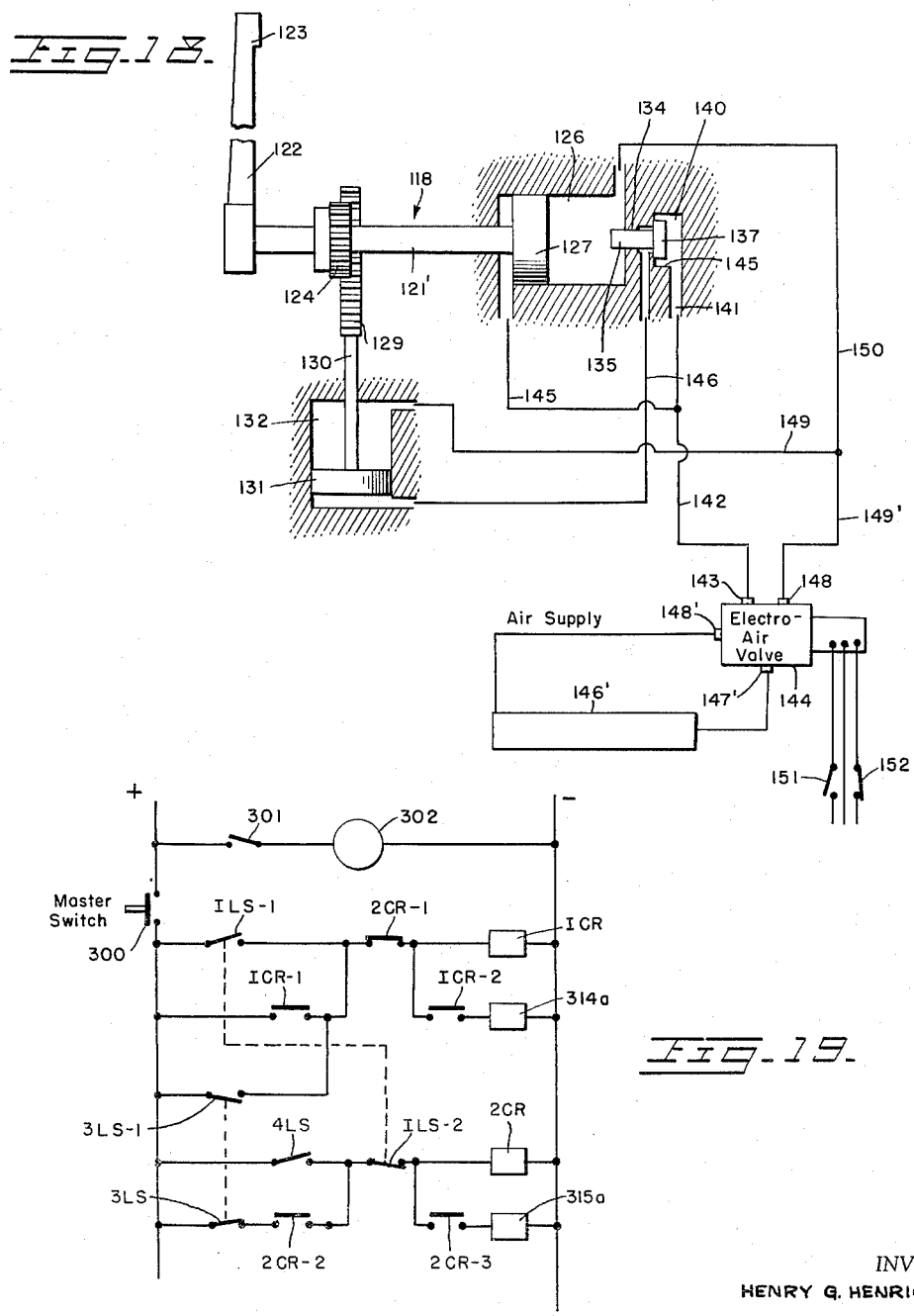
INVENTOR
HENRY G. HENRICKSON
BY James E. Tooney
ATTORNEY Jan. 26, 1965    H. G. HENRICKSON    3,167,044
FORMING APPARATUS
Filed April 14, 1958    17 Sheets-Sheet 15
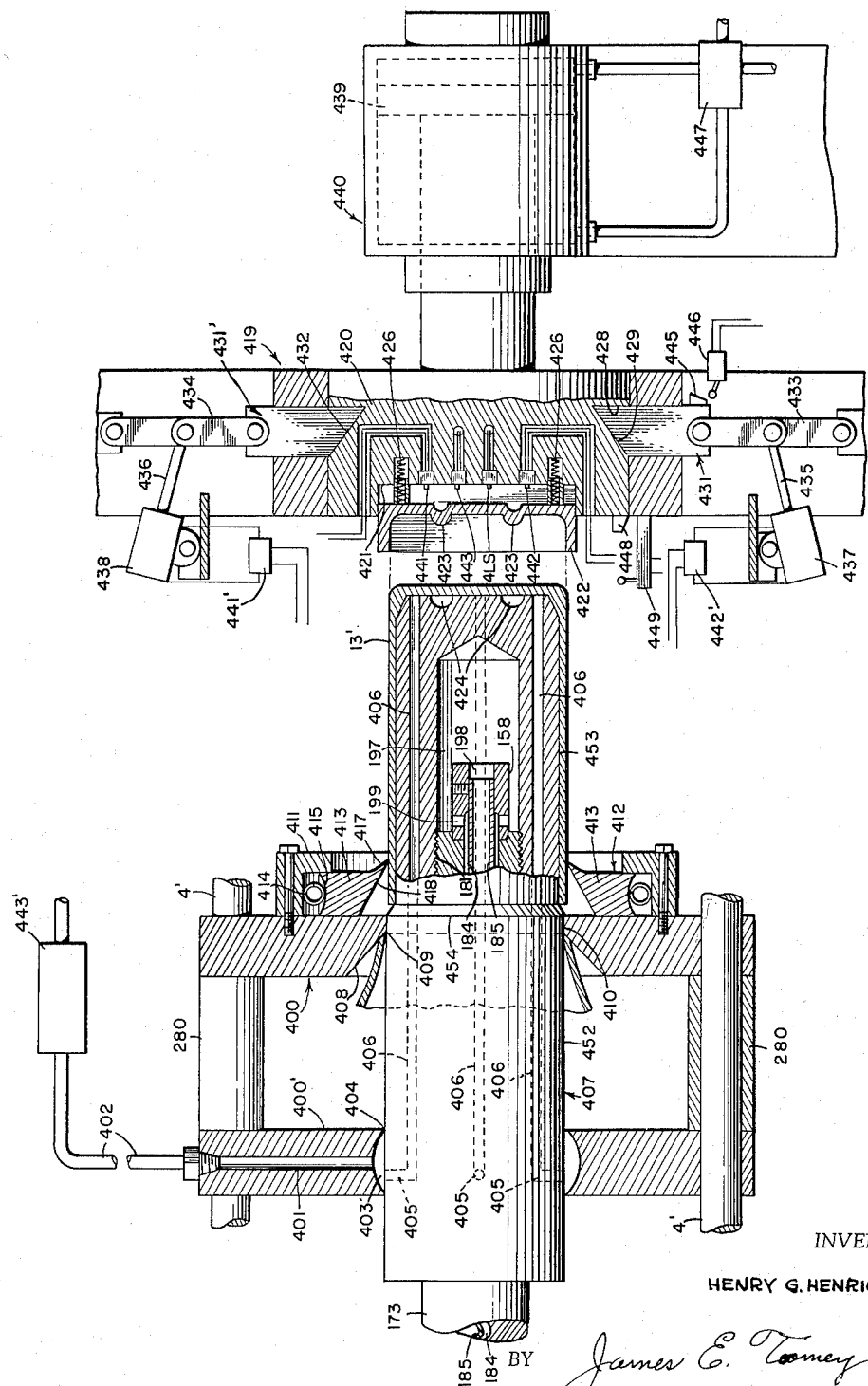
INVENTOR
HENRY G. HENRICKSON
BY James E. Toomey
ATTORNEY Jan. 26, 1965  H. G. HENRICKSON  3,167,044
FORMING APPARATUS
Filed April 14, 1958  17 Sheets-Sheet 16

INVENTOR
HENRY G. HENRICKSON
BY James E. Tooney
ATTORNEY

Jan. 26, 1965     H. G. HENRICKSON     3,167,044
FORMING APPARATUS

Filed April 14, 1958     17 Sheets-Sheet 17

INVENTOR
HENRY G. HENRICKSON

BY James E. Toomey

ATTORNEY

United States Patent Office 3,167,044
Patented Jan. 26, 1965

3,167,044
FORMING APPARATUS
Henry G. Henrickson, Mount Prospect, Ill., assignor to Kaiser Aluminum & Chemical Corporation, Oakland, Calif., a corporation of Delaware
Filed Apr. 14, 1958, Ser. No. 728,149
26 Claims. (Cl. 113—46)

This invention relates to an apparatus for forming metal blanks into predetermined shapes. More particularly, it is concerned with providing a novel apparatus for forming tubular-like articles, such as container bodies, wherein successive flat metal blanks are drawn in a unique fashion to a predetermined configuration by the use of a double-acting piston means operable in conjunction with unique blank feeding and blank holding and drawing die means such that movement of the piston means in either direction results in a working stroke. Novel means are also employed for cooling the piston means. As a result, a separate tubular-like body is advantageously formed at the end of each operating stroke of the piston means in either direction. This application is also a continuation-in-part application of application Serial No. 600,751, filed July 30, 1956 and now abandoned.

The instant application is particularly concerned with improvements in a machine of the type disclosed in application Serial No. 600,751, whereby the speed of operation of such a machine and the maintaining of production speeds therefor can be fully realized while using the shortest practical stroke for the punch even in those instances where flat blanks of relatively thin gauge metal, such as flat steel or aluminum blanks, are used and where special problems are involved in the handling and drawing of the same.

To attain these objects, the apparatus under consideration is provided with a unique arrangement for feeding successive flat metal blanks or workpieces from a stack of flat metal blanks to a set of forming dies and a cooperating punch. A unique piloting arrangement is also provided herein for holding and centering the individual workpieces with respect to one or more forming dies and the forming punch during the initial and subsequent parts of the individual forming operations. The means for actuating the double-acting piston means has incorporated therein a novel system for cooling the several punches affixed to the opposite ends of the common piston means. By cooling the punches, any expansion or growth in the punches due to frictional heat generated during movement of a punch through a set of forming dies will be reduced to a minimum. This feature, when combined with the unique manner in which the various parts of the instant machine are arranged and while using die accessories having unique punch and workpiece piloting features, will insure uniformity in the wall thicknesses of metal container bodies or workpieces drawn on the machine. Means are also provided whereby during the drawing operations the means for feeding individual flat blanks to a set of forming dies, the means for centering and holding flat blanks in place with respect to a set of dies and the punch therefor during the initial drawing of the blanks, and the means for operating and cooling the individual forming punches are all synchronized with each other.

Accordingly, it is an object of the present invention to provide a novel tubular body forming press wherein a plurality of tubular-like bodies can be made from a plurality of flat blanks during one full reciprocation of the piston means for the press, whereby maximum production speeds can be obtained.

It is a further object of this invention to provide a novel tubular body drawing apparatus wherein novel pressure pad means are employed in conjunction with a double-acting piston means and a plurality of die elements for holding and retaining an initially unworked flat blank against a die element during the initial movement of the piston means toward the die element along with novel means for actuating the pressure pad means.

It is a further object of this invention to provide a novel tubular body drawing apparatus wherein novel feeding means are employed for selecting individual flat blanks from a stack of blanks and for directing a flat blank to a die means as well as means for holding and retaining the blank against the die means during the initial movements of a punch toward and through the die means.

A further object of this invention is to provide a unique arrangement for cooling a plurality of forming punches affixed to a common piston means.

Another object of this invention is to provide a unique system for cooling a plurality of forming punches affixed to a common piston means wherein the cooling system is incorporated in the means for actuating the piston means.

A further object of this invention is to provide an apparatus wherein novel punch means are affixed to the opposing ends of common piston means, with the punch means in turn being cooled in a unique fashion to minimize growth of the punch in a radial direction as a result of frictional heat developed during the drawing operation and to permit the production of container bodies having walls of uniform thickness throughout.

It is a further object of this invention to provide a novel apparatus for drawing substantially finished tubular-like bodies from flat blanks in a single pressure applying operation, wherein the punch used in association with the die is cooled in a unique fashion to minimize growth in a radial direction due to a frictional heat generated during the drawing operation and wherein means are employed to insure constant axial alignment between the punch and die during movement of the punch along with a workpiece through the die such that can bodies having uniform wall thicknesses will be easily drawn and shearing and fracturing of the tubular-like workpiece during the forming thereof is eliminated.

It is a further object of this invention to provide a unique apparatus for forming tubular-like bodies from flat blanks comprised of a double-acting piston means to both ends of which are attached forming punches which cooperate with opposing sets of die members in such a fashion that several container bodies can be successively drawn during a single operating stroke of the piston means and wherein novel means are employed for centering and holding the flat blanks in registry with the die means prior to the initial drawing thereof.

It is a further object of this invention to provide workpiece piloting means in a set of forming dies wherein the piloting means engages substantially the entire peripheral portion of the workpiece as it exits from a die and passes to the next succeeding die, the engagement taking place in such a fashion that a controlled movement of the workpiece to the next succeeding die will be effected and the axis of the workpiece will be kept in registry both with the axis of the first-mentioned forming die and the next succeeding forming die.

It is a further object of this invention to provide a novel tubular body forming apparatus comprised of a plurality of punches operated by a common piston means, with the punches being insertable in floatingly mounted dies so that offsetting of a punch axis with respect to a die axis will be minimized during movement of a punch through a die.

It is a further object of this invention to provide a novel container body drawing apparatus comprised of a double-acting piston means and die means along with novel means for trimming the ragged edge of container bodies formed on the drawing apparatus.

It is another object of this invention to provide a novel container body drawing apparatus comprised of piston means and uniquely mounted die means for drawing tubular container bodies along with unique stripping means for removing the formed container bodies from the apparatus at the end of the forming operation.

It is a further object of this invention to provide in combination with a double-acting piston means and a plurality of uniquely arranged die means for drawing tubular bodies, novel means for forming a peripheral lip on the drawn tubular body substantially immediately after the drawing operation.

Other objects and advantages of the instant invention will become more apparent from a review of the following detailed description when taken in conjunction with the appended drawings wherein—

FIG. 1 is an over-all side elevational view of the novel tubular body drawing apparatus of the instant invention;

FIG. 2 is a side elevational view, with parts broken away, of the blank feeding means for one side of the drawing apparatus disclosed in FIG. 1 and discloses the manner in which the feeding means is arranged with respect to the one side of the drawing apparatus;

FIG. 3 is a sectional end view of the feeding means shown in FIG. 2, with parts removed for the sake of clarity, and when taken along line 3—3 of FIG. 2;

FIG. 4 is a detailed sectional view of a blank rack and a suction plate device, which forms a part of the feeding means, and discloses the suction plate device in the act of removing a blank directly from a stack of blanks in the blank rack;

FIG. 6 is a sectional view, with parts broken away, of a part of the main piston and cylinder means used for operating the punches in the drawing apparatus of the instant invention and discloses the manner in which the punches are cooled;

FIG. 7 is a sectional view of a preferred pressure pad device employed at one side of the apparatus to hold a flat blank adjacent a set of dies immediately prior and during the initial movement of a forming punch through the dies, with certain of the die elements in a set of dies also being shown in section;

FIG. 8 is an end view of a floatingly mounted bottoming die which may be used with each set of dies disposed at the opposite ends of the drawing apparatus;

FIG. 9 is a broken sectional view of the bottoming die shown in FIG. 8 when taken along line 9—9 thereof; this figure also discloses an arrangement for floatingly mounting other forming dies of the apparatus;

FIG. 9a is another sectional view of the bottoming die shown in FIG. 9 and indicates the manner in which it operates a switch in the electrical control system for the piston actuating means;

FIG. 10 is a sectional view taken through one side of the drawing apparatus of the instant invention with parts removed for the sake of clarity and discloses the position and manner of operation of an arm used to assist in registering a blank with respect to a die and the forming punch and the pressure pad associated therewith;

FIG. 11 is a top plan view, partially in section, of a device for actuating the blank centering arm disclosed in FIG. 10;

FIG. 12 is a sectional view taken along line 12—12 of FIG. 11;

FIG. 13 is a sctional view taken along line 13—13 of FIG. 12;

FIG. 14 is a sectional view taken along line 14—14 of FIG. 12;

FIG. 18 is a schematic diagram of the pneumatic system used to operate a blank registering arm;

FIG. 19 is a schematic diagram of a suitable electrical circuit for automatically operating certain of the hydraulic and pneumatic systems of the apparatus;

FIG. 20 is one sectional view of an edge trimming and lip forming attachment which may be used with the tubular body forming apparatus of the instant invention with parts removed for the sake of clarity;

Figure 5:
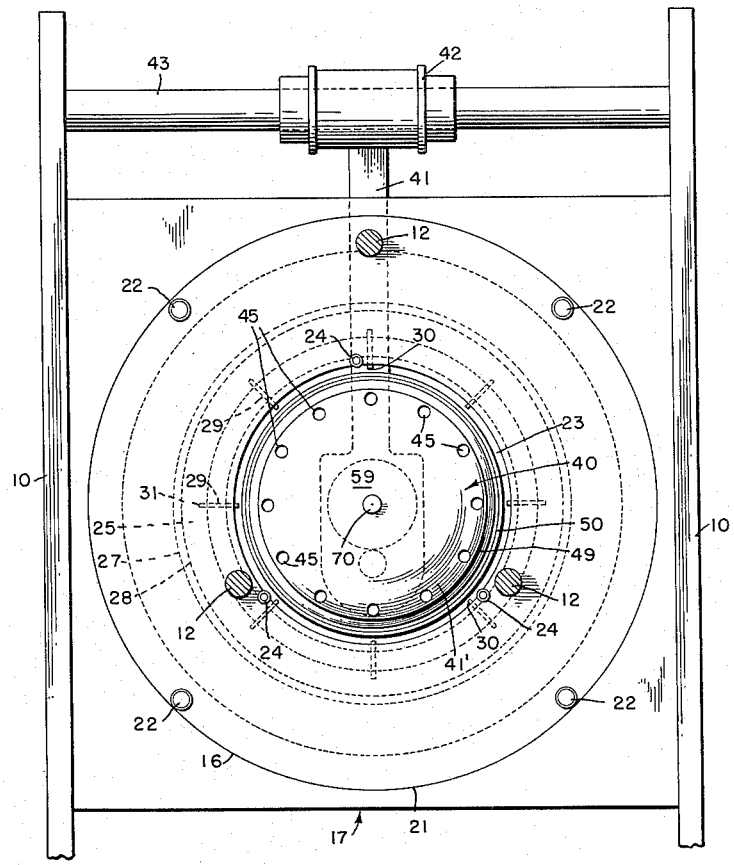
FIG. 5 is an end view of the blank rack shown in FIGS. 2 and 4.

Since both sides of the apparatus of the instant invention are similarly constructed, with the result that a description of one side will suffice for both, the apparatus will be generally described with particular reference to the right-hand side thereof, as viewed in FIG. 1.

With further reference to the drawings, the apparatus of the instant invention is generally comprised of a pedestal or base member 1 mounted upon the floor of the building or the like. Affixed to the base 1 is an elongated cylinder barrel 2. The opposing ends of the cylinder barrel 2 are mounted within the support blocks 3.

Disposed adjacent the support blocks 3 are additional supporting blocks 3' secured to the sleeve members 4 disposed within the ends of the cylinder barrel 2, all as indicated particularly in FIG. 7. The several supporting blocks 3 and 3' which support a plurality of anchoring rods 4' extend outwardly from the opposite ends of the cylinder barrel 2. These rods in turn act as anchoring and support means for the various die elements in a set of die elements 2', as will be indicated more fully hereinafter. The rods 4' are secured to the blocks 3 and 3' by means of the nuts 5 and 5' secured to one of the threaded ends or extremities of the rods 4'. Also, as indicated in FIG. 1, the apparatus is provided with two elongated rod assemblies 6, one for each side of the apparatus. These rod assemblies extend the entire length of the machine. Each rod assembly includes an intermediate segment 6' disposed in suitable openings in the supporting blocks 3 and 3' and outer opposed segment 7. Secured to each of the opposite ends of the intermediate rod segment 6 is a pressure pad assembly 8 and secured to the outermost extremities of each of the rod segments 7 is the movable section of a bottoming die assembly 9, all as will be indicated more fully hereinafter. As indicated particularly in FIGS 1–5, disposed on each side of the apparatus adjacent the set of dies 2' is a blank feeding rack 11 and a blank feeder unit 14, both of which are generally disposed between and supported by the upstanding plates 10 mounted on platform 10' secured to the top of cylinder barrel 2.

The blank feeding rack 11 generally comprises three or more rods 12 located in spaced relationship to each other and forming an inclined cage for the stack of flat blanks 13. The one extremity of the rods is secured to a flat and somewhat Z-shaped plate 12'. Plate 12' in turn is mounted on the common support 14'. Support 14' is adjustably affixed by suitable means (not shown) on the leg 15 secured to standard 15'.

Rods 12 are disposed in a generally inclined path and are secured at their other extremities to a housing plate 16 mounted in a feeder base frame 17 disposed between and secured to the upstanding plates 10. When a plurality of flat metal blanks such as aluminum blanks 13 are disposed intermediate the rods or bars 12 and a weighted backing plate 19, which is slidably mounted on the topmost bar 12 by means of the collar 20, the plate 19 will exert pressure upon the stack of blanks and cause the individual blanks to be forced downwardly along the guideway formed by the bars 12 and toward the feeder housing plate 16. The feeder housing plate 16 generally comprises a disk-like member mounted within the opening 21 of the feeder base frame 17. The feeder housing plate 16 is held in place in frame 17 by suitable bolt means 22, as indicated in FIG. 5. The feeder housing plate 16 is provided with a central opening 23 which is surrounded on the blank entrance side of the plate by a series of pilot pins 24 for guiding the blanks 13 toward the opening 23. Opening 23 is also slightly larger in diameter than the flat blanks 13 which are received in this opening. The blank exit face of plate 16 is provided with a series of annular stepped recessed portions 27 and 28. A solid ring of resilient material, such as rubber ring 25 or the like, is disposed within recess 28. A plurality of slots 29 project radially inwardly from the recess 28 and toward the opening 23 in the housing plate. Mounted in each of these slots is a knife element 30. The bottom portion of each knife element is provided with wings 31, whereby the knife element may be locked between the shoulder 27' located between the recesses 27 and 28 and the shoulder 29' located between slots 29 and recess 28, with the rubber ring 25 in turn resiliently biasing each of the knife elements 30 in their respective slots, all as indicated in FIG. 4. Also removably secured to the blank exit side of plate 16 by suitable means (not shown) is a keeper ring 30', as indicated particularly in FIG. 4, for maintaining the knife elements in place. It will also be noted by reference to FIGS. 4 and 5 that the exposed edge of each of the knives 30 projects but a short distance into the opening 23 for the purpose of holding or retarding the downward movement of the stack of metal blanks 13. While the knife elements do not project upwardly into the opening 23 to such an extent that they will prevent the ready removal or separation of the blanks from each other in a manner to be described, the edges of the knives will effect a certain small scoring of the outer periphery of the blanks as the blanks are drawn through the opening 23 and are separated from each other. This small scoring, however, is for all practical purposes negligible in connection with the later drawing of the blanks.

The means for removing the individual blanks from the blank housing plate or holder 16 will now be described. These means comprise a suction or vacuum disk assembly 40 secured to the lower portion of lever arm 41. The lever arm 41 is pivotally mounted by means of the journal bearing sleeve portion 42 at the top thereof to an elongated crossbar 43 disposed between the opposing upstanding plates 10 of the feeder unit 14. The vacuum disk assembly 40 includes a vacuum or suction disk 41' provided with a plurality of spaced openings or channels 45 adjacent the outer periphery thereof. Each of these openings communicate with one of a series of channels or bores 46, which radiate outwardly from and are in communication with the central opening 47 in the center of the disk 41', as indicated particularly in FIGS. 4 and 4a. The outer periphery of the vacuum disk 41' is also provided with an annular recess 48, within which is disposed the base of a circular rubber-like ring 49. The outer lip 50 of this ring overlies or extends outwardly from the front face of vacuum disk 41'. The lever arm 41 is provided with a channel 51, which is attached by a coupling 51' to a suitable conduit which leads to a vacuum pump (not shown). The vacuum pump operates to maintain a constant vacuum on the channel or conduit 51. The central opening 47 in disk 41' also communicates with a channel 53 in the stepped annular plug member 59, secured by bolts 53' to the arm 41. Plug member 59 is also secured by suitable means (not shown) to the vacuum disk 41'. Channel 53 communicates with the annular recess 53' in plug member 59 and recess 53' in turn communicates with chamber 54 in arm 41. Conduit 51 in arm 41 also communicates with chamber 54. Chamber 54 and recess 53' accommodate the spring biased ball check valve 56 with the inner portion or shoulder 60 of plug member 59 acting as the seat for the valve. Opening 47 in disk 41' also communicates with another chamber 56' in arm 41. Affixed to the arm 41 adjacent the outer end of chamber 56' is a stepped ring-like member 57 provided with a central tapered opening 57' and an atmospheric exhaust vent 58 communicating with this opening. The shoulder 58'' of this ring-like member 57 acts as a seat for the spring biased ball check valve 59' located in chamber 56'.

Figure 4A:
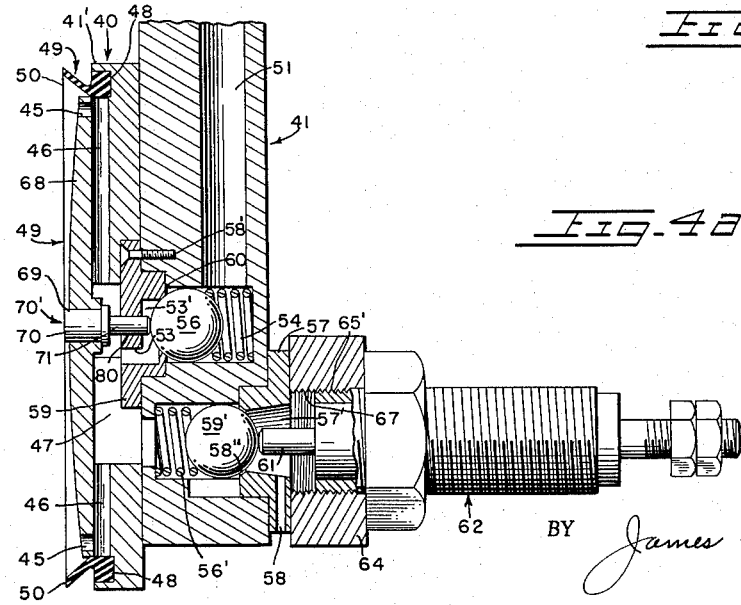
FIG. 4a is an enlarged sectional view of a portion of the suction plate device disclosed in FIG. 4 and shows the position of certain elements thereof when the plate device is in a position of rest.

As indicated particularly in FIG. 4a, ball check valve 59' is adapted to become unseated when it contacts the adjustably disposed stem member 61 in a conventional stem mounting assembly 62. If desired, a helical spring 63 may be employed for resiliently biasing the outer portion stem member 61. The assembly 62 is mounted between the plates 10 by means of the crossbar 64. This crossbar is secured to plates 10 by means of bolts 65, with the threaded sleeve 65' of the stem assembly 62 being disposed in the threaded opening 67 in the crossbar 64. By referring to FIGS. 4 and 4a, it will be observed that the blank contacting portion of suction or vacuum disk 41' is provided with a concave face 68. Face 68 has a centrally disposed opening 69 for receiving the head 70 of a pin 70'. The stem 71 of the pin 70' protrudes through an opening 80 in the plug member 59 and operates to unseat the ball check valve 56 in a manner to be described hereinafter.

The means for operating the lever arm 41 comprise a hydraulic piston and cylinder assembly 72 secured to the plates 10 by means of the crossbar 73'. The piston rod 73 of piston 360 is secured to linkage block 74 and block 74 is flexibly secured to the arm 41 by the links 75 and pins 75' and 76. The operation of the vacuum disk assembly in withdrawing a blank 13 from the stack of blanks in the blank holder assembly 11 and blank housing 16 will now be described, it being remembered that ball check valve 56 is normally urged to the left and ball check valve 59' to the right under the action of their respective springs as viewed in FIGS. 4 and 4a. When, as indicated in FIG. 4a, vacuum disk assembly 40 and arm 41 are at rest, ball check valve 59' will normally be open and ball check valve 56 closed. As the vacuum disk assembly 41' and lever arm 41 are moved forward or to the left, as viewed in FIGS. 4 and 4a, ball check valve 59' will automatically close and remain closed until arm 41 is again moved backwards. Ball check valve 56 will remain closed as arm 41 moves to the left until such time as the head 70 of pin 70' strikes the forward or leading blank 13 in the blank feeder housing 16, whereupon valve 56 will open and vacuum line 51 will be connected with opening 47, bores 46 and channels 45 on the face 68 of disk 41'. As the disk 41' engages the leading blank 13 in the stack of blanks a vacuum will be pulled on the outer periphery of the leading blank with the air being evacuated through the openings 45, bores 46, central opening 47, chamber 54 and then through opening 51 in the lever arm to the vacuum pump. At this time, also, the lip 50 of rubber ring 49, which has engaged the outer periphery of the blank, will be flattened by the force of the vacuum pulled on the blank. This will effect a vacuum seal between the blank and the disk 41'. When the vacuum is effected, the blank will also be slightly dished as the edges thereof are flexed or bent toward the right. It has been found that an efficient way of breaking the vacuum and mechanical seal between adjacent metal blanks due to friction, etc., is by pulling the vacuum on the individual blanks adjacent the outer periphery. This vacuum and mechanical seal between blanks is enhanced due to the fact that the blanks are flat and rest against one another. The blanks also frequently have oil on their surface whereby they will also tend to stick together.

At the time a blank is securely engaged by the vacuum disk assembly 40, the piston 360 in the piston and cylinder assembly 72 is reversed whereby the lever arm 41 and disk 41' will be drawn backwards. During this time, ball check valve 56 will remain open and valve 59' will remain closed, thereby maintaining the vacuum on the blank 13. This vacuum will be maintained until the ball check valve 59' contacts the stem member 61, as indicated in FIG. 4a. Upon contact with stem member 61, this ball check valve will open whereby air will enter the assembly through vent or opening 58 whence it passes through opening 57', chamber 56', into opening 47, and finally into bores 46 and ports 45, thereby breaking the vacuum and causing the blank to be released from the assembly 40 and the ball check valve 56 to be closed. Movement of lever arm 41 will also stop at this time.

At the time the blank is released, it will be in a position directly between a set of guide rails 79, as indicated in FIG. 3, and over a series of feed rollers 80', which then act to direct the blank toward a set of die elements 2'. The guide rails 79 act to direct the blank 13 to the blank feeding rollers. The series of blank feed rollers 80' are disclosed more fully in FIGS. 2, 3 and 4. They comprise a central driving shaft 85 suitably journaled between the side frames or plates 10 of the feeder assembly 14, a pair of wiping rolls 86 and 87 partially disposed in the oil pans 88 and 89 mounted on the pairs of supporting brackets 90 and 91 secured to the side frames 10. Wiping rolls 86 and 87 mate with the feed rolls 92 and 93 respectively disposed intermediate the two wiping rolls 86 and 87 in the path of travel of the blank. Located above feed rolls 92 and 93 is another pair of feed rolls 94 and 95. All of the feed rolls 92, 93, 94 and 95 are suitably journaled in the side frames 10. In an advantageous embodiment of the invention, journal bearing blocks 92' for the two wiping rolls 86 and 87 may be slidably mounted in the windows 93' of the side frames 10. Set screws 94' secured to the journal bearing blocks may then be employed to adjust the wiping rolls 86 and 87 with respect to feed rolls 92 and 93 so as to control the amount of oil deposited on the feed rolls.

The rolls are driven by means of an electric motor 96 to which is connected a drive shaft 97. Mounted on drive shaft 97 is a sprocket 98, which is surrounded by the lower part of an endless chain 99. The upper part of this chain 99 surrounds the drive sprocket 100 located on the drive shaft 85. Also secured to the drive shaft 85 at the left end thereof as viewed in FIG. 3 is a driving gear 101, which meshes with a drive gear 102 on the shaft 103 for the roller 95. Gear 102 in turn meshes with the gear 104 on the shaft 105 for the roller 94. The opposing or right hand end of the drive shaft 85, as viewed in FIG. 3, is provided with a driving gear 106 which meshes with a drive gear 107 on shaft 106' for the roller 93, with gear 107 in turn meshing with the gear 108 disposed on the shaft 108' for the roller 92. Gear 107 also meshes with gear 109 on the shaft 109' for the roller 87, while gear 108 is adapted to mesh with the gear 110 on the shaft 110' for the roller 86. Thus, rollers 95, 93 and 86 are adapted to rotate clockwise and rollers 87, 92 and 94 counterclockwise. By adjustably mounting rollers 86 and 87, the amount of oil picked up from the oil pans 88 and 89 and passed on to the feed rolls 93 and 92 which are in contact with the oil wiping rolls 86 and 87 can be easily regulated as well as the ultimate lubrication given to each of the blanks 13 passed through the roller assembly 80'.

It will also be noted, by reference particularly to FIGS. 2 and 3, that the bite of the feed rolls 92 through 95 is disposed in a vertical line directly below the release point of vacuum disk assembly 40, whereby when the vacuum disk 41' releases a flat metal blank it will be immediately passed through guides 79 and then down through feeding rollers assembly 80' and into the guideway 112. This guideway comprises a pair of spaced vertically disposed rails 113 located immediately below feed rollers 92 and 93. Each rail is provided with a notch 114 for receiving and controlling the downward movement of the blanks toward a set of dies 2'. As the blanks move downward in the guideway 112, they will normally come to rest on top of the nose portion 218 of pressure pad unit or assembly 8 and immediately above and adjacent to the cupping die assembly 116, as indicated particularly in FIG. 7. As the pressure pad unit is moved backward in a manner to be described hereinafter, the blanks will then be allowed to drop free of the pressure pad and downwardly into the space 116' between pressure pad unit 8 and the cupping die assembly 116 coming to rest on a series of forwardly projecting finger elements 117, secured to the ring portion 115 of the pressure pad unit and slidable in suitable openings 118' in cupping die assembly 116 all as particularly indicated in FIGS. 7 and 10.

In an advantageous embodiment of the invention and in order to be sure that the blanks when they fall free of the pressure pad unit 8 are properly deposited upon the holding fingers or bars 117 a blank centering means is provided as indicated in FIGURES 3, 10–16 and 18.

This blank centering device comprises a housing 118, which is suitably mounted on a base plate 119 with the base plate 119 in turn being secured by the bracket 120 to a plate 10. Disposed in housing 118 is a rotatable and longitudinally slidable shaft 121'. Affixed to one end of the shaft 121' is an arm 122 provided with a flag type extension 123 which is curved to fit the general contour of the blank 13 which it engages. Keyed to the intermediate portion of shaft 121' is a driving gear 124 located in the opening 125 in the housing 118. Housing 118 is also provided with an air chamber 126 within which is disposed the piston 127 secured to the other extremity of the shaft 121'. Also secured within the opening 125 in the housing 118 adjacent driving gear 124 is a vertically disposed channel-shaped guideway 128. Mounted in guideway 128 is a slidable rack 129, the teeth of which engage or mesh with the teeth of driving gear 124. As indicated particularly in FIG. 15, the rack 129 is secured to one end of the piston rod 130. A piston 131 secured to the other end of rod 130 is disposed in the chamber 132 in the base of the housing 118.

Figure 15:
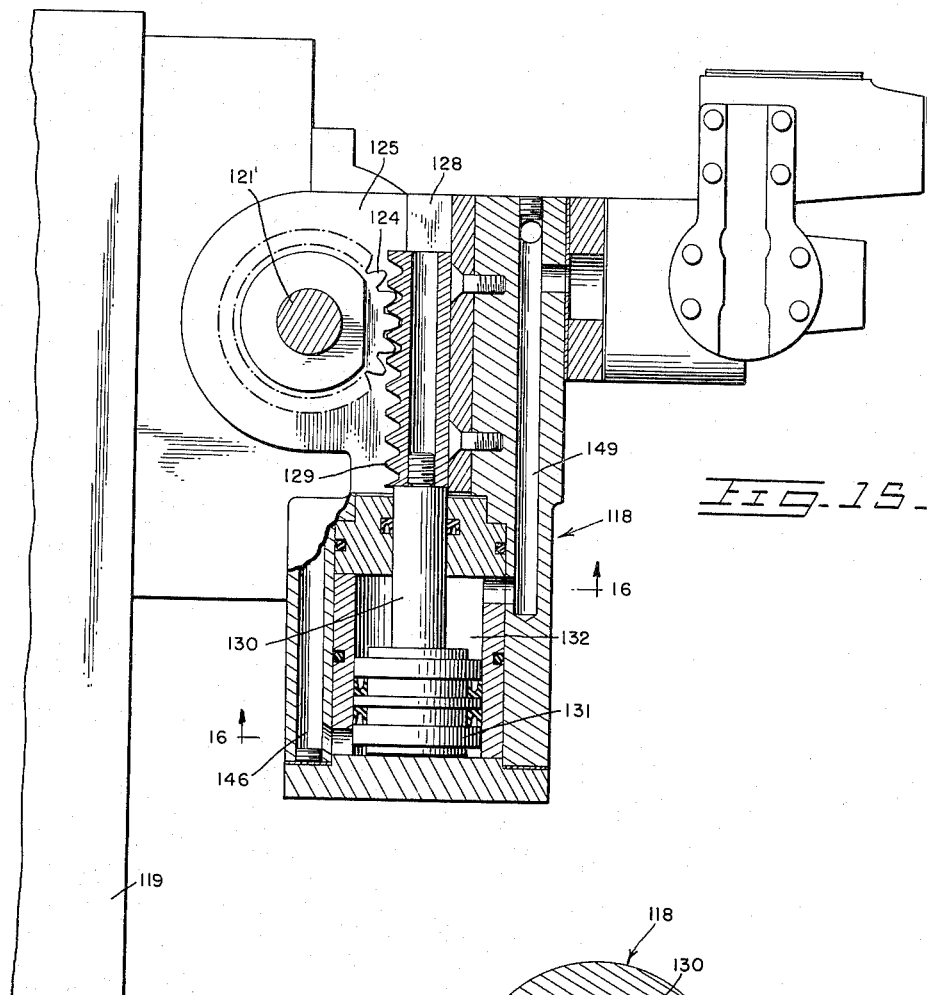
FIG. 15 is a sectional view taken along line 15—15 of FIG. 13 with parts removed for the sake of clarity.
Figure 16:
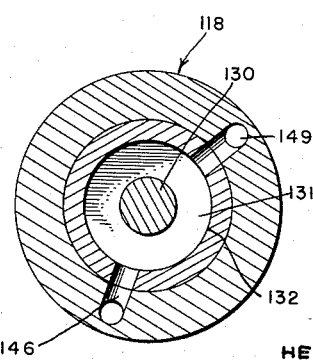
FIG. 16 is a sectional view taken along line 16—16 of FIG. 15.

With further reference to the drawings and in particular to FIGS. 13 and 14, it will be observed that one end of the chamber 126 is closed by an end plate or closure 133. The central portion of this end closure 133 is provided with stepped opening 134 within which is slidably mounted the stem 135 of the spring biased valve 136. The head 137 of the valve is engaged and the valve biased in a left-hand direction as viewed in FIG. 13 by means of the helical spring 138 located in the recess 138' in the final end plate 139. As indicated particularly in FIGS. 13 and 18, the small chamber 140 in plate 133, within which the head of the valve 137 is mounted, communicates by means of conduits 141 and 142 with the port 143 of a solenoid operated air valve 144. Conduit or line 142 is also connected to the chamber 126 for the piston 127 through the medium of the branch conduit or opening 145. As indicated in FIGS. 12, 14 and 18, the recess 140 is also adapted to be connected upon the opening of the valve 137 to a conduit 146 which ultimately leads, as indicated in FIGS. 15 and 16, to the bottom side of the piston 131 in the chamber 132. As also indicated in FIGS. 12, 14, 15 and 18, the other side of the piston 131 and chamber 132 is connected to the port 148 of the solenoid operated air valve 144 by means of the conduits 149 and 149'. Finally, the exhaust side of the piston 127 is connected to the line 149' by means of the branch line 150, while the ports 147' and 148' of valve 144 lead to air supply source 146'.

The means for controlling the solenoid operated four-way valve 144 comprise a pair of micro switches 151 and 152, all of which is more clearly shown in FIGS. 7, 10 and 18. These switches which are actuated by a pair of adjustable screws 153' secured to pressure pad unit 8 during its movements backwards and forwards are disposed in micro switch assemblies 151' and 152' affixed to adjustable bracket 154'. Bracket 154' is mounted adjacent a pressure pad unit 8 on the supports 3 and 3'. It will also be noted that the blank engaging arm 122 must have two movements namely, a lateral movement and then a rotating movement in order to properly clear various portions of the apparatus and to engage the blank being fed through the guide assembly 112. Thus in the case of the arm 122, as shown in FIG. 13, it must first be moved to the right before being rotated downwardly. In this operation, it is also to be noted that the gear 124, which engages the rack 129, is also locked or keyed to the shaft 121' in a suitable fashion such that the gear will move with the shaft and still remain in contact with rack 129.

The operation of the centering arm mechanism is as follows. As the pressure pad unit 8 moves away from a set of die elements 2' and the micro switches 151 and 152 is a manner to be later described, it causes normally open switch 151 to open and normally closed switch 152 to close. At this time, as indicated particularly in FIG. 18, ports 147' and 148 of valve 144 will be connected, whereby air from the source 146' will pass through valve 144 and lines 142, 141 and 145. This will cause movement of the piston 127 to the right as viewed in FIGS. 13 and 18 until such time as piston 127 contacts the stem 135 of valve 136. At this time, valve 136 will move to the right and open thereby permitting air to flow from line 141 into line 146 from whence it will pass to the bottom of chamber 132 for the piston 131. At this time also the shaft 121' for the arm 122 will have been moved to the right under the action of piston 127, whereby the arm 122 will be located directly over the blank 13 that has begun to slide into the opening 116' between the nose of pressure pad unit 8 and a set of die elements 2'. The vertical position of the arm 122 at this time is generally indicated at A in FIG. 10. The feeder disk assembly 40 also operates in a manner to be hereinafter more fully described, such that not more than one blank will be disposed in the guideways 122 at any one time. Upon the opening of conduit 146 air will pass to the bottom of the chamber 132 causing piston 131 to move upward whereby the rack 129 will cause rotation of shaft 121' through the medium of the gear 124, whereby the arm 122 will be moved downward approximately to the position indicated by B in FIGURE 10. As the arm 122 moves downward it will engage the top of the blank 13 whereby forcing the blank into its proper initial drawing position with respect to the cupping die assembly 116 and the pressure pad unit 8 and onto the holding pins 117 projecting from the pressure pad and between guide rails 117' affixed to the nose portion of the pressure pad unit. At the same time, since ports 148 and 148' of valve 144 are also connected air may be exhausted from lines 149, 149' and 150 and into a suitable tank for air supply source 146'.

At about the same time that arm 122 reaches the position B the pressure pad unit 8 is so adjusted that it will begin its forward movement toward the cupping die assembly 116 with the blank 13 in turn now resting on pins 117. As the pressure pad unit 8 moves forward it will cause the arm 122 to be retracted in the following manner. As the pressure pad moves forward it will cause normally open switch 151 to close and normally closed switch 152 to open. The closing of switch 151 and opening of switch 152 will then actuate the solenoid valve 144 in such a manner that port 143 will be connected to port 148' and port 148 to be connected to port 147'. As a result air will then pass from the air source 146' through ports 147' and 148 into lines 149', 149 and 150 first to the top side of the piston 131 causing movement of the piston downwards and then to the other side of piston 127 causing movement of the latter piston to the left as viewed in FIG. 13 and allowing valve 136 to close. The pneumatic circuit is so designed that piston 131 will be operated slightly ahead of piston 127 whereby the arm 122 will be rotated upward just prior to the time that the piston 127 will retract thereby bringing the arm as well as the shaft 121' back to its initial position of rest. This is to allow air from chamber 132 to be discharged through valve 136 into lines 141 and 142 and back to air source 146' along with air from chamber 126 and line 145. As the arm 122 moves upward from position B to position A another blank will have dropped down through guides 112 onto the nose portion 218 of the pressure pad unit 8.

The structure of a pressure pad unit 8, the forming punch and the dies associated therewith will now be described as well as the means employed to operate the punch and pressure pad unit it being remembered that there is a separate pressure pad unit, punch and a set of dies for each side of the apparatus. Thus, a description of the punch, pressure pad unit and set of dies for one side of the apparatus will suffice for both sides. As indicated particularly in FIGS. 1, 2, 6, 7 and 17, a second cylinder 165 is located within the main cylinder housing 2 in spaced relationship thereto. The second cylinder 165 is held in spaced relationship with respect to the cylinder housing 2 by means of the spider like spacing element 166 thereby forming an air chamber 167 between the two. The open ends of cylinder housing 2 and cylinder 165 are closed by means of the end caps 168. Each end cap 168 is also provided with a bore 169 which connects chamber 167 with the outside of the cylinder housing 2. Each end cap 168 is also provided with a series of centrally disposed and stepped openings 170, 171, 171' and 172 within which is slidably inserted an elongated piston rod 173. A sleeve member 174 is also disposed in the stepped opening 172. The sleeve member surrounds the rod 173 and acts as a stabilizing device for rod 173. The sleeve 174 is secured to the end closure 168 by suitable bolt means 175. Suitable gaskets and packing members 176 and 177 are used to seal the interior 155 of cylinder 165 from the outside so as to prevent leakage of the fluid ejected into the hydraulic fluid chamber 155. The piston 178 secured to the intermediate portion of the elongated piston rod 173 divides the interior chamber 155 of cylinder 165 into two parts, whereby entrance of hydraulic fluid from the opening 156 at the right hand side of cylinder 165 as viewed in FIG. 6 will move piston 178 to the left and entrance of the fluid from the left through opening 157 will drive piston 178 along with the piston rod 173 to the right. It is also to be noted that the inner surface of each end cap 168 is provided with a shoulder 179, which is adapted to contact the piston at the full end of its stroke in either direction and to act as a stop therefor. The piston rod 173 is provided at each extremity thereof with a threaded portion 181 by means of which a forming punch or ram 182 may be threadably secured thereto as indicated particularly in FIG. 7. Piston rod 173 is provided with a central bore 184. This bore extends the entire length of the piston rod. Concentrically mounted within bore 184 is a pipe 185. The disposition of the pipe 185 with bore 184 is such as to provide two concentrically arranged conduits, namely, conduit 186 in the pipe and conduit 187 between the pipe 185 and the main piston body. The pipe 185 is held in position in the central bore 184 by means of the fittings 158 secured to the ends of the pipe as well as by means of a series of externally threaded sleeve members 188 of which there are several on each side of the piston 178. Sleeve members 188 are inserted in threaded openings or bores 190 in the sides of the piston rod 173.

The central portions of these sleeve members are hollowed out to provide an opening 192 for a ball 191 of a ball check valve assembly. Also secured to the piston rod 173 and on each side of the piston 178 is one or more externally threaded sleeve members 193. The interior of each of these sleeve members is also hollowed out to provide a chamber 193' for the ball 194 of a ball check valve assembly. Ball check valves 191 and 194 may be spring biased if desired.

Sleeves 188 are also provided with bores 195 which communicate with openings 196 in the wall of pipe 185, and with the chambers 192 in sleeves 188 for the purpose of placing chambers 192 in open communication with the interior 186 of pipe 185. For the purpose of having chambers 193' in sleeve members 193 communicate with conduit 187 the sleeves 193 and piston rod 173 are provided with bores 194' which are in communication both with chambers 193' and the conduit 187. The aforesaid check valve assemblies as well as the central bore and pipe disposed in piston rod 173 are employed to cool the forming rams or punches 182 during operation of the instant apparatus. They serve to carry off heat in the rams, which is generated by friction during movement of the rams or punches 182 through a set of forming dies 2', thereby preventing any undesirable radial growth in a forming ram.

By further reference to FIGURE 7, it will be observed that each of the forming rams 182 is secured to a threaded extremity 181 of the piston rod 173 and that the ram or punch is provided with a hollowed out interior 197. The sleeve member or fitting 158 secured to the end of the piston rod 173, also fits within the chamber or hollowed out portion 197 of the forming ram. Sleeve member 158 is provided with a central opening 198 in registry and communication with the opening 186 of the pipe 185 and chamber 197 of the ram. Sleeve member 158 is also provided with a plurality of radially disposed openings 199, which communicate with opening or channel 187 located between the outside surface of the pipe 185 and the main surface of the bore 184 of the piston rod 173 as well as with the chamber 197 in the ram. From the above description, it will be seen when a hollowed out ram or punch 182 is secured to one threaded end of the piston rod 173 means have been provided for placing the channels 187 and 186 in open communication with each other.

The individual punches 182 are cooled in the following manner during operation of the piston 178. When the piston is moved to the left, as indicated in FIG. 6, as fluid is introduced into the chamber 155 from the entry port 156, the same fluid will enter openings 201 in the ball check valve assemblies in the fittings or sleeves 188 located on the right-hand of the piston. Thus will cause the ball check valves 191 to be unseated whereby the piston actuating fluid can then pass through the fittings 188, channels 195 and openings 196 in pipe 185 and into conduit 186 for pipe 185 whence it will flow to both of the opposing rams 182. At the same time, the ball check valve 194 in sleeve or fitting 193 on the right-hand side of the piston 178 is urged to a closed position under the influence of the piston actuating fluid. However, with respect to the ball check valve 194 in the fitting 193 on the left-hand side of piston 178 this is forced open in the following manner. The fluid, which passes to the ends of the piston rod 173 through pipe bore 186 and then out through the opening 198 of the sleeve member 158 into the chambers 197 of the rams 182, reenters the piston rod by passing through the openings 199 in the sleeve members 158 and into the channel 187, whence it passes through the piston rod in a reverse direction until it reaches the ball check valve assembly in fitting 193 on left-hand side of the piston. At this point, the fluid causes the ball 194 of this check valve to open and allow dumping of the fluid into the left-hand side of chamber 155 and then out through conduit 157 and back to the source of supply along with the other fluid in the left-hand portion of chamber 155. In the meantime, since there is negative pressure being exerted against the ball check valves 191 in the fittings 188 located in the left-hand side of the piston 178, these will remain closed. During the reversing of the piston 178 or movement of the same to the right as viewed in FIG. 6, the ball check valves 191 in fittings 190 on the right-hand side of the piston and the ball check valve 194 in the fitting 193 on the left-hand side of the piston will remain seated, while the ball check valve 194 in the fitting 193 on the right-hand side of piston 178 and the ball check valves 191 on the left-hand side of piston 178 will be opened so that heated fluid from the forming rams will be passed out into the right-hand side of chamber 155 and back to the source of supply. It is contemplated that in the oil tank used to supply actuating fluid for the piston 178 a suitable cooling coil will be disposed so as to cool the fluid as it passes through the same. The cooling of the several punches in the manner described provides for an efficient withdrawal of any heat in the punches that might be developed as a result of friction during movements of the punches through their respective sets of dies 2'. This in turn prevents any deleterious growth or expansion of the punches in a radial direction and which would otherwise result in a non-uniform drawing of container bodies by the punch.

It is also to be noted that each punch 182 is provided with a series of openings 200 adjacent the outside periphery thereof. The openings are vented to the atmosphere at the rear portions of the punches for the purpose of breaking any vacuum that may exist between the punch and the drawn blank at the end of the drawing operation whereby a formed cup-shaped or container-like body may be easily withdrawn from the punch by suitable blank stripping apparatus.

As indicated briefly heretofore, the means employed to hold a flat blank 13 against each cupping die assembly 116 during the initial part of the drawing operation comprises a uniquely mounted pressure pad unit 8. As indicated particularly in FIGS. 7 and 10, the pressure pad unit 8 comprises a generally cylindrical and hollowed out body 205. Portions of the side wall thereof may be open as at 203. The one end portion 206 of body 205 is provided with a central aperture 207 within which is disposed a sleeve member 208. The piston rod 173 is adapted to be slidingly inserted within the opening 209 of the sleeve member 208 and suitable gasket means 210 may be provided in the sleeve 208 for the purpose of making a seal between the pressure pad unit 8 and piston rod 173. The other end of hollowed out body 205 is disposed within and secured to an annular ring-like member 115. Gasket elements 204 disposed between hollow body 205 and the sleeve member 4 together with end closures 168 for cylinder 2 and the bottom 206 of the pressure pad form an air chamber 212, which communicates with the air chamber 167 in the main cylinder barrel 2 through the medium of the air conduit 169. Air is introduced into chamber 167 from a suitable source of supply through the medium of conduit 213 secured to the outside of the cylinder housing 2 as indicated particularly in FIGURE 6. The air in chamber 167 is maintained at a constant pressure in a manner well known in the art and constantly urges the pressure pad unit 8 toward the set of die elements 2' associated therewith.

Secured to the outer periphery of the hollow body 205 intermediate the ends thereof is an annulus 214 provided with ears 215. Threaded openings 216 in these ears receive the threaded portions 217 of the slidable rod segments 6'. The front face of the ring-like member 115 at the forward end of the pressure pad assembly 8 contains a nose 218. When the pressure pad assembly 8 is moved forward, the flat blank 13 to be drawn fits against the nose 218 and while resting on pins 117 and between guide rails 117' is held between the face of nose 218 and the front face 219 of the cupping die 220 in cupping die assembly 116 during the initial stages of the blank drawing operation. Ring-like member 115 is also provided with apertured ears 221, and the threaded portions 222 of slidable rod segments 6' fit within the threaded apertures 223 in these ears. If desired, lock nuts and washers 224 and 225 may be employed as aids in anchoring the ears 221 and member 115 to the slidable rod assemblies 6.

The sectionalized rod assemblies 6 have several functions. First, they are used to actuate and control the movements of the pressure pad assemblies 8. Secondly, they serve to center the pressure pad assemblies with respect to the sets 2' of forming dies. Finally, they also serve as the main support and motivating mechanism for the floating part 226 of the bottoming die unit 227 in assembly 9 all as more indicated particularly in FIGS. 1, 8, 9 and 9a. The rod assemblies 6 are secured to the floating unit 226 of the bottoming die assembly 227 in each set 2' of die elements in the following manner. As indicated in FIGURE 9, the threaded extremities 228 of the rod sections 7 are disposed within apertures 229 in the crossbar 230 of the bottoming die unit 227.

Crossbar 230 is adapted to fit and be loosely held between a pair of arcuate segments 231 which form part of the housing 232 for the bottoming die block 233. The bottoming die block 233 is slidably received within the opening 234 in housing 232 and is secured to bar 230 by means of the threaded pin 235, the threads 236 on the pin 235 engaging the bushing 237 secured to block 233 and the bushing 238 secured to crossbar 230. Block 233 is also provided with a suitable recess 233' for receiving the formed cup-like workpiece or body 13' shown in dotted lines in FIG. 9. Housing 232 is held in place in die holder 239 by bolt means 240 and keeper elements 241. A bracket 242 is affixed to the lowermost segment 231, and this bracket supports a micro switch assembly 243. As the bottoming die block 233 on the right-hand side of the apparatus, as indicated in FIGS. 1 and 9a, is moved to the right under the influence of a forming punch 182, it will be seen that the pressure pad unit 8 on the left-hand side of the apparatus will also be moved to the right a sufficient distance to allow a flat blank to be fed into the space 116' between the nose 218 of the left-hand pressure pad unit 8 and the set 2' of die elements on the left-hand side of the apparatus. As this pressure pad assembly 8 is moved it will overcome the air pressure in chamber 212 on the left-hand side of the apparatus, which air pressure normally is urging the pressure pad assembly toward the left-hand set of die elements. At the same time, the pressure pad assembly 8 on the right-hand side of the apparatus will be moved towards the cupping die assembly 116 on the right-hand side of the apparatus. The individual pressure pad assemblies 8 are so adjusted on the rod assemblies 6 that proper clearance between the pressure pad nose 218 and the front faces 219 of the cupping die assemblies will be provided so as to allow flat blanks 13 to be inserted in the openings 116' therebetween. From the above description it will be recognized, because the pressure pad assemblies 8 and bottoming die assemblies 227 are connected to common rod assemblies 6, that as the pressure pad on one side of the apparatus moves towards the cupping die associated therewith the pressure pad on the other side of the apparatus will move away from the cupping die associated with the latter. It will be further noted that movement of the pressure pad on the right-hand side of the apparatus toward the dies on the right-hand side will be controlled ultimately by the punch engaging the bottoming die on the right-hand side of the apparatus. The reverse is true with respect to the pressure pad and bottoming die on the left-hand side of the apparatus.

Each set 2' of the die elements includes in addition to cupping and bottoming die assemblies 116 and 227, respectively, one or more intermediate ironing die units 250 as indicated particularly in FIGURE 7. Any number of ironing die units may be used depending upon the results desired and the openings or drawing orifices 252 of each of the die rings 251 for the individual units 250 are of progressively reduced peripheral dimensions or cross-section.

The various ironing die units 250 may be of the type disclosed in FIG. 9 or as in application S.N. 600,751, wherein the die rings are floatingly mounted in die holders 255 by springs 256, bolts 255' and keepers 256' or they may be rigidly fixed to the die holders 255 as indicated in FIGURE 7 by bolts 257 and keeper segments 258. The various parts of the apparatus such as the cupping and ironing dies, pressure pad units, punches, blank centering arms, etc., are so arranged as to prevent off-setting of the punch axis with respect to the die axis during the entire drawing of a can body. Thus, can bodies of uniform wall thickness throughout can be easily drawn. In the case of where the dies are floatingly mounted and self adjusting with respect to the punches, this feature is combined with the feature of having the punches moved in a true linear path, so that the axes of both the punches and dies will remain aligned and can bodies of uniform wall thickness are obtained.

In drawing operations of the type proposed, it has been found that some of the major problems to be overcome during drawing of the blank or workpiece involve keeping the punch, workpiece and dies axially aligned, to insure a continuously uniform wall thickness in the workpiece during all drawing steps. In an advantageous embodiment of the invention, this is done by maintaining continuous control of the workpiece as it passes from one die to the next, but without simultaneously effecting a drawing action of the workpiece by more than one die at any given time. In other words, the workpiece is never in drawing contact with more than one die at any one time. This is accomplished by providing a unique piloting element such as a workholder or guide located adjacent the exit end of a die. This workholder should be of a slightly greater internal peripheral dimension or diameter than the die and of a sufficient length whereby it will slidingly support the workpiece entirely around its periphery, until the normal irregular part or trailing end of the workpiece completely clears the die with which it is associated and whereby it will continue to support the workpieces whenever necessary until the nose or forward portion of the workpiece enters the next succeeding die.

Figure 24:
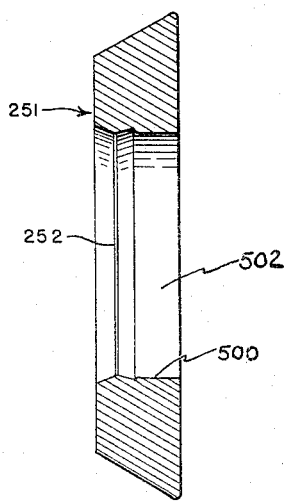
FIG. 24 is an enlarged sectional view of a forming die and discloses the punch and blank piloting accessory associated therewith.

This piloting element 500 may be made as a separate unit or be combined with the die rings 220 and 251 as indicated particularly in FIGS. 7 and 24. The piloting element is located adjacent the exit end of drawing die orifices 252 in the case of ironing dies 250 and drawing orifice 501 in the case of cupping die 220. The diameter or periphery of the opening or orifice 502 of the piloting element ordinarily will be a few thousandths larger than that of the die with which it is associated.

The functions and advantages of such a piloting element are schematically shown in FIGURE 7 wherein a cup-shaped workpiece 504, drawn in dotted lines, is disclosed as it is about to leave one ironing die and is about to make its initial entrance into the next succeeding ironing die.

In drawing operations of the instant type wherein a workpiece is first drawn into a cup-shaped body in cupping die 116 and thereafter the walls of the body are progressively lengthened by thinning or ironing in successive ironing dies 250, the top of the cup-shaped body always possesses an irregular edge 505. The irregularities so formed are known as ears.

If, as indicated in FIGURE 7, some means is not provided for positively piloting the punch and drawn workpiece as they pass from one die to the next die, the following will result. As the eared top of the workpiece such as portion 505, shown in FIGURE 7, leaves the first ironing die it will be supported in the first ironing die only at the eared section or the side portion of the workpiece as shown in FIGURE 7. Since the peripheral portion of the workpiece directly across from the eared section is actually a void the only part of the workpiece supported in the die in this eared portion. Because of the counteracting pressure exerted on the workpiece and punch by the first ironing die, the punch and workpiece will naturally follow the lines of least resistance. In the case of the blank 504, shown in FIG. 7, this would mean then that unless the blank is positively supported or guided around its entire periphery until it completely clears this first ironing die and until the nose X of the workpiece begins to enter the next die, the workpiece and ram will be forced out of axial alignment with this first ironing die as well as with the next ironing die. The wall portions of the blank 504 comprised of and adjacent to the eared section 505 will also be thicker than the remaining wall portions of the workpiece drawn on the same ironing die at about the same time as eared section 505.

This uncontrolled thickening of the eared portion 505 becomes particularly critical, when it begins to pass through the next ironing die. As this eared portion 505 enters the next ironing die the thickness of the eared portion is such that it causes a crowding or jamming of metal at the entry end of die orifice 252 adjacent the eared portion 505. Since the die orifice 252 of the second ironing die is smaller than that of the first ironing die, this crowding simply results in part of the workpiece breaking off in the form of a sliver adjacent the eared portion 505. In short, the eared wall portion 505 of the blank is simply too thick at this point of the operation to pass through the second ironing die successfully.

By the use of a piloting element 500, however, adjacent the exit ends of the cupping and ironing dies offsetting of the punches and workpieces with respect to the dies and undesirable thickening of the walls of the workpiece is prevented because the workpiece is completely supported until it leaves an ironing or cupping die and enters the next die.

Since the opening of the piloting element is of a slightly greater cross-sectional area than that of the die with which it is associated, it will merely guide or control the directional movement of the workpiece without at the same time effecting any drawing or thinning of the walls of the workpiece. The use of such a piloting element has been found to be most effective in eliminating slivers and wall fracture in the workpiece as well as the shutting down of the machine in order to remove the slivers and defective blanks all of which under full production conditions can be most costly.

Finally and what is most important is the fact that workpieces having exceptionally thin and relatively long walls can now be successfully deep drawn in a single pressure application while using a punch of a relatively short stroke. For example, initially flat aluminum blanks of 3.635" in diameter and .0065" in thickness have been successfully drawn into cup-shaped bodies having a wall thickness of .004", a wall height of 8" and a cup diameter of 1.9" without losing slivers or otherwise fracturing the workpiece.

The important of such piloting elements will be readily appreciated therefore when exceptionally thin walled containers are being produced. For example, in cases of where the tubular bodies are fabricated from initially flat blanks of aluminum and the alloys thereof having a gauge of .020" and less, and the walls of the finished or formed tubular body are approximately 20% of the thickness of the original blank or .004", uniformity of all portions of the body wall and piloting of the blank between the dies becomes proportionately more critical as the percentage of wall thickness in the body decreases at each drawing die.

In the preferred embodiment of the invention, the piloting elements and dies are also so spaced with respect to each other that the workpiece is never in the drawing orifices of any two succeeding or adjacent dies at one time.

Figure 22:
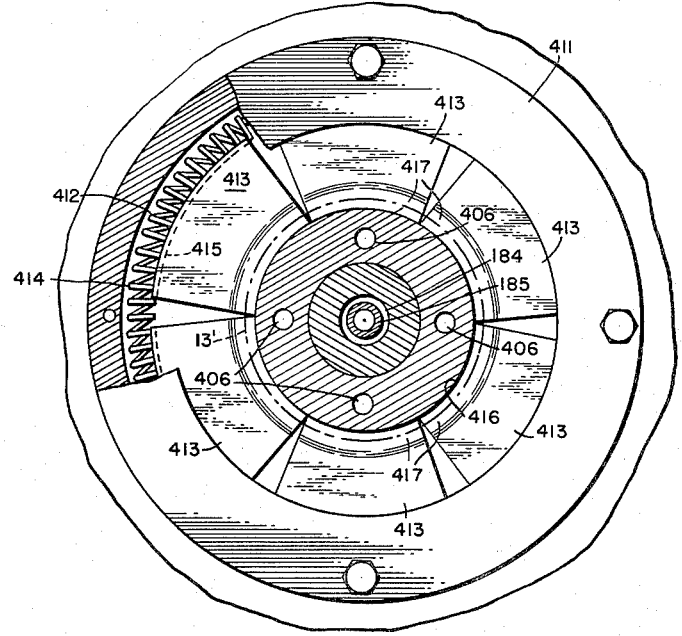
FIG. 22 is a sectional view of the apparatus shown in FIG. 21 when taken along line 22—22 thereof.
Figure 23:
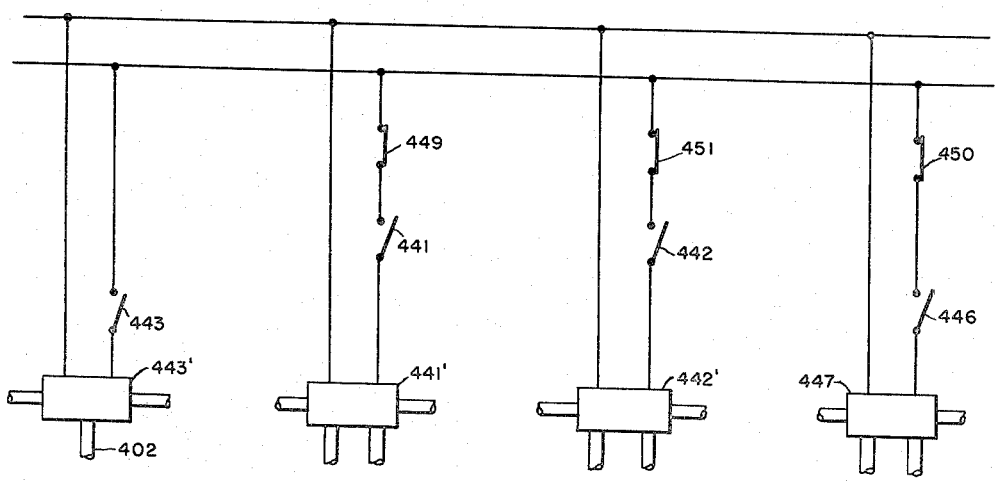
FIG. 23 is a schematic view of one suitable type of electrical control system that can be used for operating the shearing and lip forming device of FIG. 20.

Each set 2' of dies is provided with any suitable type stripping device adjacent the end of a set of dies, such as, for example, that shown in FIG. 22 and to be described more fully hereinbelow for the purpose of stripping the formed cup-like body after it has been made on the instant machine. The stripper device is interposed between the bottoming die unit 227 and last ironing die unit 250. Suitable spacer blocks 280 are also located between the various cupping and ironing die units for the purpose of regulating the distance therebetween. These blocks are mounted on the rods 4'.

Figure 17:
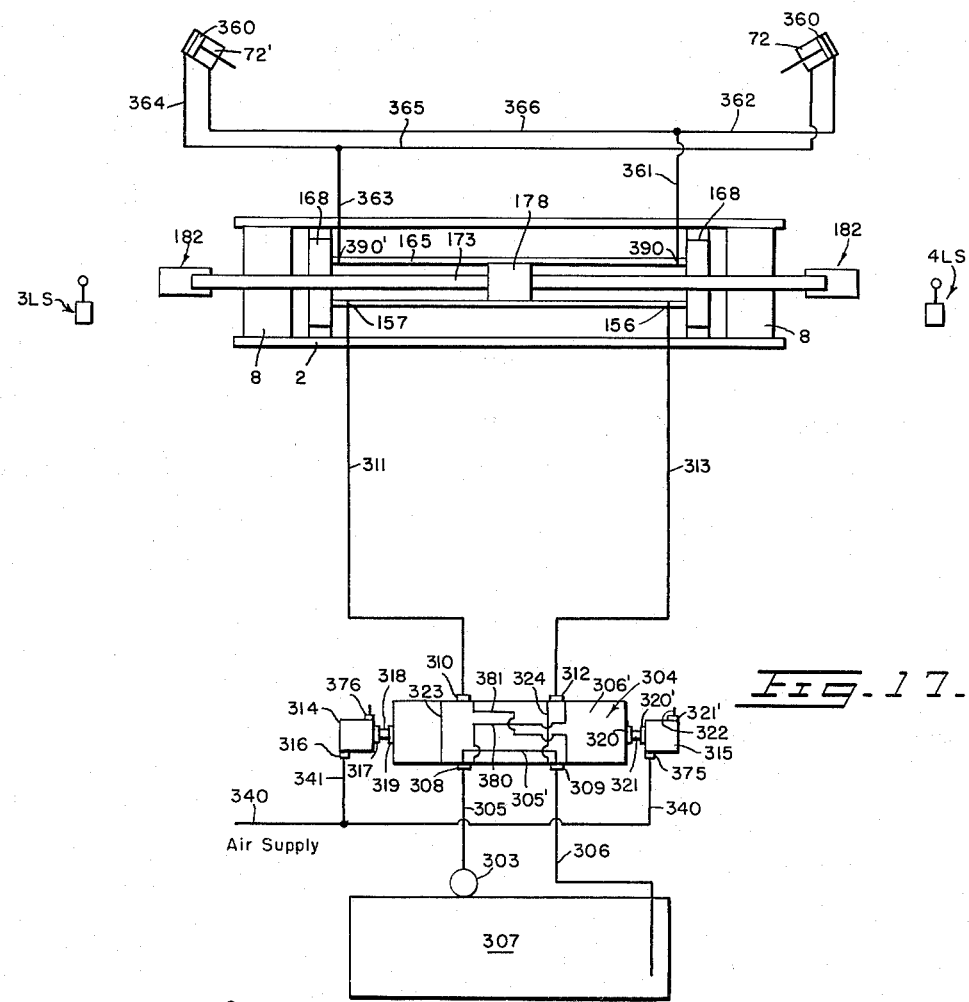
FIG. 17 is a schematic diagram of one suitable combined hydraulic and pneumatic circuit used in operating the main piston means as well as the hydraulic circuits used for operating the blank feeding mechanisms.

The operation of the apparatus will now be described reference being made to FIGS. 17 and 19 which show schematically one suitable electromechanical system for operating the instant apparatus. In operating the apparatus of the instant invention a master switch 300 is first closed as indicated in FIG. 19. Previously thereto, a switch 301 may also have been closed thereby energizing the pump motor 302 for the pump 303. The pump is connected to one side of a four-way valve 304 by a line or conduit 305. A return line 306 connects the four-way valve 304 with the supply tank 307. When the valve 304 is in a neutral position and the pump motor is turned on, fluid will be pumped from line 305 into port 308 of valve 304 and then through bore 305' in the piston block 306' of the valve and finally out through port 309 and down through line 306 to the supply tank 307. The valve 304 is connected to the left-hand side of the main cylinder 165 and piston 178 for the machine through port 310 and the line 311 and to the right-hand side of the cylinder 165 and piston 178 by port 312 and line 313. The four-way valve 304 is controlled in a manner well known in the art by the solenoid operated air valves 314 for the left side and 315 for the right side and these valves in turn are controlled as follows. Solenoid operated valve 314 is controlled during automatic operation of the apparatus by switch 3LS disposed in the switch assembly 243 mounted on the bottoming die unit at the left-hand side of the apparatus. Solenoid operated air valve 315 is controlled during automatic operation of the apparatus by the switch 4LS disposed in switch assembly 243 secured to the bottoming die unit mounted on the right-hand side of the apparatus.

The actuating pistons 360 in the right and left hand cylinders 72 and 72' for operating the vacuum disk assemblies or units 40 of the feeding mechanism for the various sides of the apparatus are connected to the main piston 178 and cylinder assembly 165 in the following manner. The right-hand side of cylinder 165 is connected to the cylinder 72 for the piston 360 by means of port 390 and the lines 361 and 362 while the opposing or left-hand side of the cylinder 165 is connected to the cylinder 72' for the piston 360 which operates the vacuum disk unit 40 at the left-hand side of the apparatus by means of port 390' and lines 363 and 364. Opposing cylinders 72 are also interconnected with each other through the medium of lines 362, 364, 365 and 366.

As indicated above upon the closure of switch 301 the pump motor 302 will be actuated thereby causing fluid to pass through line 305, ports 308 and 309 of valve 304 and line 306 back to the tank 307. When, as indicated in FIGURE 19 the master switch 300 is closed and the switch ILS-1 is closed momentarily by moving a suitable operating lever to the right, the piston 178 and punches 182 will be moved to the right as follows. The closing of switch ILS-1 in turn energizes the relay ICR. Relay ICR then acts to close normally open switches ICR-1 and ICR-2. Upon the closure of switch ICR-1, a holding circuit will be set up around switch ILS-1, maintaining energization of the relay ICR. As indicated in FIG. 19, the closing of switch ICR-2 in turn will cause the energization of solenoid 314a for valve 314. Energization of solenoid 314a causes the opening of port 316 for this valve whereby air can pass from air supply lines 340 and 341 into port 316 of valve 314 and out of port 317 of valve 314 into line 318 and port 319 of valve 304 and against the left side of piston block 306' causing piston block 306' to shift to the right. At the same time, ports 320' and 321' of valve 315 will be connected whereby air on the right-hand side of piston block 306' in valve 304 can be vented to the atmosphere from port 320 of valve 304, line 321 through valve 315 and line 322. As piston block 306' moves to right, lines 305 and 311 will be connected through the medium of ports 308 and 310 in valve 304 and bore 323 in piston block 306'. Simultaneously line 306 is connected with line 313 through the medium of ports 309 and 312 in valve 304 and bore 324 in piston block 306'. As fluid passes through line 305, valve 304, line 311 and port 157 in cylinder 165, piston 178 will be moved to the right along with the several rams 182. At the same time, fluid in the right-hand side of cylinder 165 will be returned to the tank 307 through port 156 in cylinder 165, line 313, valve 304 and line 306. Fluid will simultaneously pass through the conduits 186 and 187 in piston rod 173 in the manner previously described for the purposes of cooling the several forming punches 182. It is also to be noted that at the same time piston rod 173 and piston 178 are moved to the right, the piston 360 in cylinder 72 at the right-hand side will be moved to the left thereby bringing the vacuum disk unit 40 at the right-hand side of the apparatus into contact with a blank 13. In the meantime, piston 360 in cylinder 72' at the left-hand side of the apparatus is being moved also to the left, whereby a blank selected from the left-hand blank rack will be placed in position over the left-hand feed roll assembly 80'. This is accomplished as follows. As piston 178 moves to the right fluid is forced out of port 390 in cylinder 165 and into lines 361 and 362 and thence into the right end of cylinder 72. Fluid is also forced out of the left side of this same cylinder 72 through lines 365 and 363 through port 390' of cylinder 165 and into the left side of cylinder 165 at the same time fluid is passed into the right side of cylinder 72' through line 366 and out of the left end of cylinder 72' and through lines 364 and 363 into the left side of cylinder 165. At the end of the stroke of piston 178 to the right, right-hand punch 182 will force the floating block 233 of the bottoming die assembly 227 at the right-hand side to engage the limit switch 4LS in right-hand switch assembly 243 thereby energizing relay 2CR. This in turn causes a closing of normally open switches 2CR-2, 2CR-3 and an opening of normally closed switch 2CR-1 in the circuit for relay 1CR. Opening of switch 2CR-1 opens the circuit to relay 1CR, whereby relay 1CR drops out. When relay 1CR drops out it opens switch 1CR-2 and causes de-energization of solenoid 314a and a shifting of valve 314. The closing of switch 2CR-2 on the other hand sets up a holding circuit around switch 4LS whereby relay 2CR will be energized upon the release of switch 4LS by the block 233. Energization of relay 2CR and the closing of normally open switch 2CR-3, causes energization of the solenoid 315a for air valve 315. This will cause a shifting of valve 315, whereby ports 375 and 320' of this valve will be connected. Upon the connection of ports 375 and 320' air from a suitable supply source will then pass through line 340, ports 375 and 320' of valve 315 and into the right-hand port 320 of valve 304 through line 321 moving piston block 306' to the left. In the meantime, valve 314 will have been shifted whereby port 317 is connected to port 376 and line 318 and the left-hand port 319 of valve 304 so that air on the left-hand side of piston block 306' in valve 304 can be vented to the atmosphere.

As piston block 306' is moved to the left ports 308 and 312 in valve 304 will be connected by means of bore 380 in piston block 306' so that fluid can pass from line 305, valve 304 and line 313 to the right side of piston 178 in cylinder 165. At the same time, ports 309 and 310 in valve 304 will be connected through bore 381 in piston block 306'. As piston 178 is moved to the left under the influence of fluid entering cylinder 165 from the right through port 156 in cylinder 165 fluid on the left of piston 178 is being exhausted through port 157 and lines 311 and 306, to tank 307. The two pistons 360 in cylinders 72 and 72' will also be moved to the right. As a result of this action the vacuum disk assembly 40 on the left will be moved into engagement with a blank in the blank holder assembly on the left, while the vacuum disk assembly 40 on the right having now selected a flat blank from the blank holder assembly associated therewith, will now act to deposit the selected blank in the right-hand feeder roll assemby 80'. This is accomplished as follows. As the piston 178 moves to the left fluid on the left-hand side of piston 178 in cylinder 165 will be forced out of opening 390' in the cylinder and into line 363, whence it passes to the left-hand side of cylinder 72' through line 364 and to the left-hand side of cylinder 72 through line 365. Fluid from the right hand side of cylinder 72' and the right-hand side of cylinder 72 will be directed to port 390 on the right-hand side of cylinder 165 through lines 366, 362 and 361. At the end of the stroke of the piston 178 to the left, the left-hand punch and formed workpiece body will cause the momentary depression of switch 3LS in the left-hand microswitch assembly 243. Switch 3LS which is a normally closed switch is then opened and upon opening will break the holding circuit for relay 2CR with relay 2CR then dropping out. As relay 2CR drops out it will cause normally open switches 2CR-2 and 2CR-3 to open and normally closed switch 2CR-1 to close. Conventional linkage means are also provided for connecting another momentarily acting switch 3LS-1 to switch 3LS, whereby when switch 3LS is opened switch 3LS-1 will be closed. Since switch 3LS-1 is disposed in circuit with relay 1CR and switch 2CR-1 switch 2CR-1 now being closed the closing of switch 3LS-1 will enable relay 1CR to be reenergized. Reenergization of relay 1CR causes the reclosing of switch 1CR-1 thereby setting up the holding circuit for relay 1CR and a closing of switch 1CR-2 for solenoid 314a of valve 314, which then acts in the manner previously described. In the meantime, of course, solenoid 315a has dropped out and as the piston block 306' moves to the right port 320 and line 321 of valve 304 are again connected to ports 320' and 321' of valve 315 so that air on the right-hand side of the piston block 306' can pass through the valve 315 to the atmosphere. The apparatus will continue to cycle and the flat blanks will continue to be fed to the several sides of the device as long as master switch 300 remains closed. As an added safety feature, switch 1LS-1 may be mechanically linked to another switch 1LS-2 in the circuit for relay 2CR. When switch 1LS-1 is opened, switch 1LS-2 is closed and vice-versa. This in turn means that when relay 1CR is energized by the closing of switch 1LS-1 relay 2CR will be prevented from being energized. During all of this time, of course, the two pressure pad assemblies 8 will be withdrawn from and returned to their respective blank holding positions in the manner previously described. As the pressure pad assemblies 8 move back and forth they will in turn control the operation of the various centering arms 122 in the manner set out above, whereby a continuous operating cycle for the machine will take place.

In a further advantageous embodiment of the invention and as particularly indicated in FIGS. 20-23, means may be provided if desired for making a completely finished container body on the same apparatus instead of merely drawing a tubular blank and thereafter transferring the container body to a trimming machine where the rough or eared top edge of the tubular body or workpiece is removed and a suitable peripheral lip formed at the top of the container. Since the same arrangement may be used on both sides of the apparatus a description of one will suffice for both.

In this case, the outermost ironing die ring unit 250 is replaced with a modified die ring 400 and an air ring 400' is interposed between die ring 400 and the next adjacent die ring unit 250. Air ring 400' is provided with a port 401 connected to a suitable source of air supply by a hose 402. Port 401 also communicates with an interior annular recess 403 located adjacent the central opening 404 in the air ring. Air introduced into hose 402 thus will pass through port 401, recess 403, and into the plurality of openings and bores 405 and 406 in the modified stepped surfaced ram 407 to be used in this arrangement.

Die ring 400 is further provided with a tapered throat 408 only on the entry side of the ring instead of on both the entry and exit sides as in the case of the other ironing die ring unit 250 and a short flat planar surface 409 adjacent the central opening 410 in the ring. Secured to the exit side of die ring 400 by means of the annular keeper-element 411, which is bolted to the ring, is a segmented stripper and lip forming member 412. This stripper and lip forming member 412 is comprised of a plurality of tapered or roughly pie-shaped segments 413 resiliently held together by an annular helical spring member 414 which fits into a groove 415 in the outer periphery of each of the segments 413 and in between the segments and keeper element 411. The inner ends of the segments 413 are cut off and curved so that when the segments are assembled they form an expandable and contractable stripping annulus provided with a central opening 416. Each of the segments is also so constructed that it is provided with a lip portion 417 adjacent the opening 416 on its outside surface and tapered or cutaway portion 418 adjacent opening 416 on its inside surface.

Mounted in spaced relation to the die ring 400 and its associated stripper and lip forming member 412 is a bearing block assembly 419. This assembly is comprised in turn of a pressure block 420 provided with a recess 421 on the inner surface thereof. Slidably and resiliently disposed within the recess 421 by means of springs 426 is a bottoming die cup 422 provided with embossing ribs 423 which are adapted to mate with the rib recesses 424 in the leading edge of the ram 407 when the ram 407, with the formed container body 13' thereon, fully depresses die cut 422 into the recess 421 against the action of springs 426 for the purpose of placing reinforcing embossments in the bottom portion of the container body 13'. Die cup 422 is also provided with outwardly projecting ears 430 shown in dotted lines in FIG. 21 by means of which it is secured to the rod assemblies 6 also connected to the several pressure pad units 8, whereby movement of die cup 422 into recess 421 on one side of the apparatus will cause the movement of the pressure pad unit 8 on the other side of apparatus away from the set of dies associated therein in the manner previously described. Pressure block 420 is also provided with an annular groove 428, one of the walls 429 of which is tapered. Slidably mounted within the recess 428 are a pair of cam elements 431 and 431'. These cam elements have the proper arcuate shape along their edges and a tapered wall portion 432 so as to fit within the recess 428. Cam elements 431 and 431' are controlled by conventional linkage assemblies 433 and 434 connected to piston rods 435 and 436 mounted in the pneumatic cylinder assemblies 437 and 438.

The side of pressure block 420 which is opposite to that having the recess 421 is secured to the piston 439 mounted in cylinder 440. Also mounted in the recess 421 of pressure block 420 are pressure operated switches 441, 442 and 443 and the switch 4LS. Switches 441 and 442 control the actuation of the solenoid operated four way valves 441' and 442' for controlling the operation of the pneumatically operated pistons in the cylinder assemblies 438 and 437. Switch 443 is used to control the operation of two way valve 443' which in turn controls the introduction of air into the air ring 400'. Also affixed to the one side of cam element 431 is a cam surface 445 which is used to operate the switch 446. Switch 446 controls the four way solenoid operated valve 447. Secured to pressure block 420 is a cam surface 448 of a sufficient length to operate the plurality of aligned switches 449, 450 and 451 (only one of which is shown in FIG. 20). Switches 449 and 451, which are normally closed, are in the circuit leading to the control valves 441' and 442'. Switch 450, which is also normally closed, is in the circuit leading to valve 447. Switch 450 may be set so that it will operate a short time ahead of switches 449 and 451 in the line of switches. In addition to switch 4LS, an electrical and hydraulic circuit similar to that shown in FIGS. 17 and 19 and is used to control the actuation of the apparatus in the manner previously set forth in addition to that used to operate the portions of the apparatus set forth in FIGS. 20 to 23.

Figure 21:
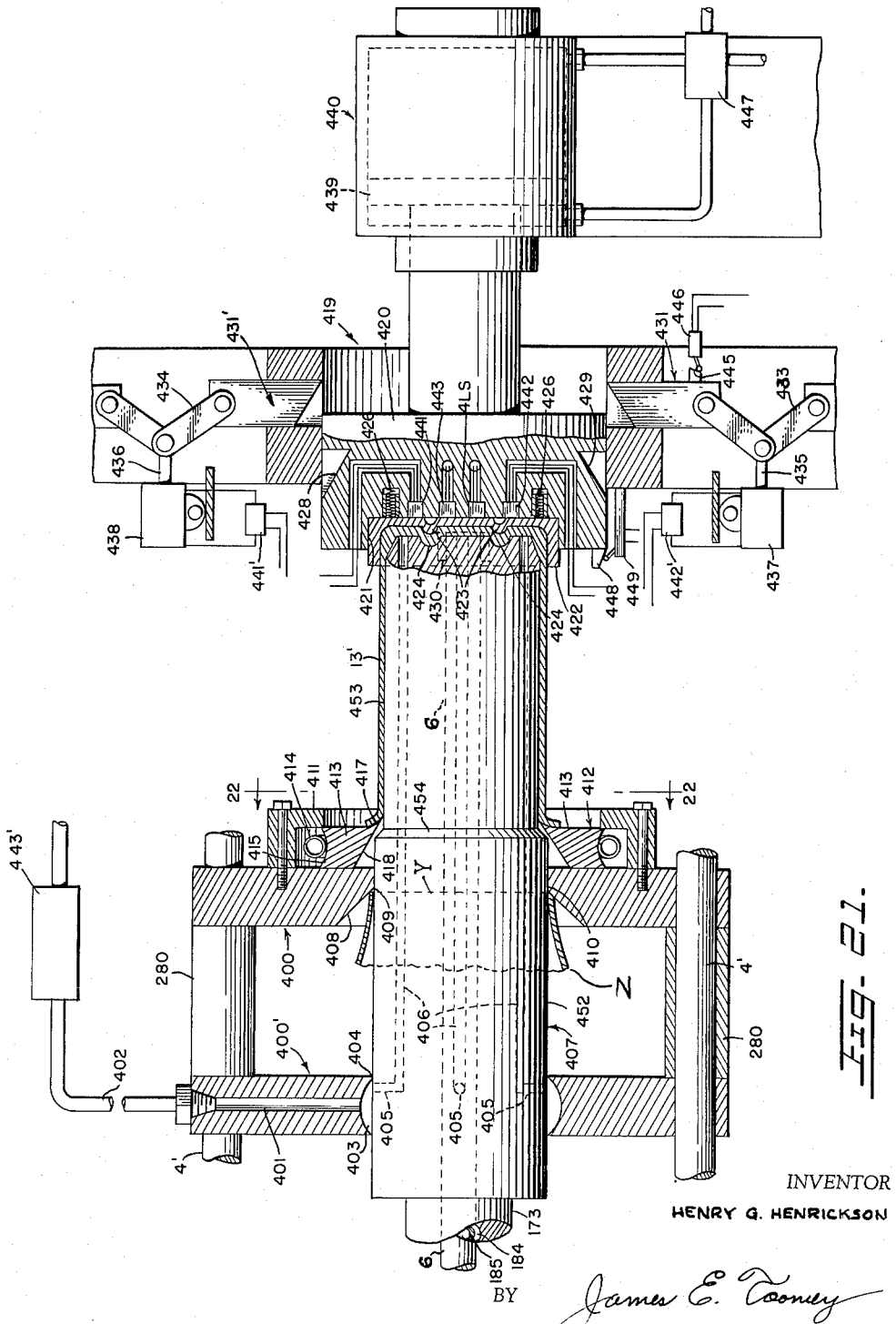
FIG. 21 is another sectional view of the edge trimming and lip forming attachment shown in FIG. 20 and indicates how it is used to form a lip on the container body.

The operation of the portion of the apparatus disclosed in FIGS. 20-23 is as follows. As the ram 407 provided with adjacent stepped surfaces 452 and 453 leaves the last ironing die unit 250 it passes through the air ring 400' and into the ring assembly 400. The stepped surface 452 of ram 407 projects upwardly from the surface 453 a distance substantially equal to the thickness of the wall of the container body 13' formed on the ram immediately adjacent the ram surface 453. This means that as the container body 13' is forced through the opening 410 in die ring 400, the final portions of the container body adjacent the beginning 454 of stepped portion 452 on the ram will be evenly pinched off along the periphery of the container body approximately at line Y as indicated in FIG. 21. As the ram 407 continues its forward movement, the ragged portion Z of the container body will remain in loose contact with the ram or punch 407. As the ram 407 with the container body 13' thereon moves further to the right, the container body 13' will pass the stripping and lip forming assembly 412 whereby the segments 413 thereof will drop down under the action of spring 414 onto the surface of the ram. Ram 407 and container body 13' will in the meantime move forward until they contact the die cup 422 resiliently biased in pressure block 420 and move die cup 422 inwardly until it bottoms along with can body 13' in the recess 421. Movement of die cup 422 inwardly will also move the pressure pad unit 8 on the opposite side of the apparatus away from the set of dies associated therewith. At this time also the ram 407 will have almost reached the end of its stroke after which it will begin its return stroke and move to the left as viewed in FIG. 20 by reason of contacting switch 4LS. It will not begin its return stroke, however, until it has exerted enough pressure on die cup 422 and pressure block 420 to effect embossments in the bottom of the container. Simultaneously with contact being established between the bottom of the recess 421 and the die cup 422 in pressure block 420, switches 441, 442 and 443 will be closed in addition to switch 4LS thereby actuating rapid closing valves 441', 442' and 443' in addition to valve 304. The closing of valves 441' and 442' will in turn cause rapid actuation of the pistons in pneumatic cylinders 437 and 438 whereupon the cam elements 431 and 431' will quickly move outwardly and release the brake on pressure block 420. As soon as cam element 431 moves outwardly, it causes tripping of switch 446 controlling valve 447 whereupon pressure piston 439 will move to the left as viewed in FIGS. 20 and 21. As a result, pressure will be exerted on the pressure block 420 and in turn on workpiece 13' forcing workpiece 13' back against the stripper and lip forming assembly 412. Switch 446 is also a rapid closing switch. This will insure movement of piston 439 as rapidly as possible so as to urge pressure block 420 against the can body 13' and thereby maintain depression of switches 441, 442 and 443. Any continued depression of switch 4LS will also not hinder actuation of ram 407 to the left. Lip portions 417 on the segments 413 will cause the wall of the container body adjacent its open end to be rolled into a rim of the proper configuration. In the meantime also, tripping of pressure switch 443 in pressure block 420 will also cause closing of the lines leading to valve 443'. Closing of valve 443' will permit introduction of air into air ring 400' and through air ring 400' into the openings 406 and 405 whereupon the container body will have become released from the ram so that the ram can fully retract from container body 13'. This closing of switch 443 may also take place, if desired, substantially slightly ahead of switches 441 and 442 whereby the container body 13' will become released from the ram 407 just before the ram begins its backward stroke. Movement of container body 425 backwards is stopped when the cam surface 448 on pressure block 420 exerts the proper pressure on switches 449, 450 and 451, thereby opening these normally closed switches. Upon the opening of switches 449, 450 and 451, switch 450 being set so as to open ahead of switches 449 and 451, valve 447 will operate to reverse the flow of air in cylinder 440 and cause the retraction of piston 439 and pressure block 420 along with die cup 422 then moving outwardly from the bottom of recess 421 in the pressure block under the action of the anchoring springs 426. Valves 441' and 442' will operate soon thereafter to reverse the flow of air to cylinders 437 and 438. This will cause movement of cam elements 431 and 431' inwardly and a locking of pressure block 420 in its initial position of rest. As the cam elements 430 and 431 move inwardly switch 446 will also be reopened. In the meantime, switches 449, 450 and 451 will be allowed to close again as the cam surface 448 recedes away from the rollers of the switches 449, 450 and 451. At the same time, pressure is released on switches 441, 442, 443 and 4LS. Release of pressure on switches 4LS, 441, 442 and 443 also causes the full opening of these switches. Upon opening of switch 443, valve 443' leading to air ring 400' will also be closed. As the piston 439 retracts, the completely formed container body 13', now stripped from ram 407, is allowed to fall into a suitable collection hopper. The ragged edge Z of the container body will also be stripped from the ram 407 because of the blocking action of air ring 400' thereagainst and allowed to fall into a separate scrap collection hopper. If desired, special means may be attached to air ring 400' to assist in stripping the ragged edge Z from the ram, such as an air nozzle directed downwardly against the ragged edge Z.

From the above, it will be obvious that a unique machine has been herein provided for the manufacture of tubular bodies from very thin, flat blanks of aluminum, steel or other metals. The tubular bodies can be rapidly manufactured at either end of the machine and at the end of a stroke in either direction of the piston 178 within the chamber formed in cylinder 165. Each of the container bodies may also be completely trimmed and have a lip formed thereon prior to leaving the apparatus. Speed of operation is also maintained by keeping the length of piston and punch stroke to a minimum.

It is obvious that various changes and modifications may be made in the instant device without departing from the spirit and scope thereof as defined in the appended claims, wherein what is claimed is:

1. An apparatus for drawing cup-shaped bodies from initially flat metallic blanks comprising the combination of a first and second set of opposed forming dies, each set of forming dies also including a floating punch bottoming member, a common piston means disposed intermediate said sets of forming dies, means for reciprocating said piston means in a true linear path and between said dies, a punch connected to each of the opposed sides of said piston means and insertable in one of said sets of forming dies, a pressure pad associated with each punch and each set of forming dies for engaging and holding a flat blank against the first forming die in a set of forming dies during initial movement of the punch through the set of forming dies, a common rod means secured to both of the opposed punch bottoming members and the opposed pressure pads whereby movement of the punch connected to the one side of said piston means into engagement with the bottoming member on said one side will cause the pressure pad on the other side of said piston means to be moved away from the set of forming dies associated therewith so that flat blank can be inserted between said last-mentioned set of forming dies and said last-mentioned pressure pad and means actuated by the floating bottoming member on one side of the piston means during engagement of the die with a punch at the end of the operating stroke thereof for actuating said piston reciprocating means whereby said piston means and said last-mentioned punch will be moved away from the said bottoming member.

2. The device as set forth in claim 1 including means normally urging a pressure pad toward the set of forming dies associated therewith.

3. The device as set forth in claim 1 including means floatingly mounting certain of the forming dies in a set of forming dies.

4. In a device for forming cup-shaped bodies from initially flat metallic blanks, the combination of a piston means and a separate punch secured to the opposite sides thereof, a set of forming dies disposed on each of the opposite sides of said piston means in cooperative relationship with each of said punches, each set of forming dies including a floatingly mounted bottoming die, means for reciprocating said piston means and moving said punches into and out of the sets of forming dies associated therewith, a separate pressure pad associated with each punch and each set of forming dies for engaging and holding a flat blank against the said set of dies during initial movement of the punch therethrough, a common means connecting all of the opposed bottoming dies and the opposed pressure pads together whereby movement of the punch connected to the one side of said piston means and into engagement with the bottoming die on the said one side of the piston means will cause the pressure pad on the other side of said piston means to be moved away from the set of forming dies associated therewith so as to allow a flat blank to be inserted between said last-mentioned set of forming dies and said last-mentioned pressure pad, feeding means for depositing said flat blank between past last-mentioned set of forming dies and pressure pad and means actuated by the piston reciprocating means for operating said feeding means.

5. In a device for forming cup-shaped bodies from initially flat metallic blanks the combination of a piston and a separate punch secured to the opposing sides thereof, a set of drawing dies disposed on each of the opposite sides of said piston whereby a set of dies will be associated with each punch, each set of forming dies including a floatingly punch bottoming member, means for reciprocating said piston and for moving each of said punches into and out of the set of forming dies associated therewith, means including said piston reciprocating means for cooling the punches, a separate pressure pad associated with each punch and each set of dies for engaging and holding a flat blank against the set of dies during initial movement of the punch therethrough, common means connecting all of the opposed punch bottoming members and the opposed pressure pads together whereby movement of the punch connected to one side of the piston into engagement with the bottoming member on said one side will cause the pressure pad on the other side of said piston to be moved away from the set of forming dies associated therewith so as to allow a flat blank to be inserted between said last-mentioned set of forming dies and said last-mentioned pressure pad.

6. A combined operating and cooling system for a piston actuated ram to the opposite ends of which punch members are connected, comprising a cylinder and an elongated ram disposed in said cylinder, a piston secured to the intermediate portion of the ram, said ram also being provided with a plurality of interior condits extending the entire length thereof, a punch provided with a hollow interior, which is in open communication with all of said conduits secured to each end of the ram, a pressure operated valve means on each side of the piston for placing one of the conduits in the ram and the hollowed out interiors of the punches in communication with the piston actuating fluid disposed in said cylinder alternately with the fluid located on the one side of the piston and then with the fluid on the other side of the piston so as to cause entrance of fluid into the last-mentioned conduit and hollowed out interiors of the punches and a second pressure operated valve means on each side of the piston for placing another of the conduits and the hollowed out interiors of the punches in communication with the piston actuating fluid in said cylinder alternately with the fluid on one side of the piston and then on the other side of the piston and in an opposite manner to said first-mentioned valve means so as to cause removal of the fluid from the ram and punches.

7. A combined system for both operating and cooling a working ram and punches affixed to the opposite sides thereof, comprising a piston and cylinder, an elongated ram secured at an intermediate portion thereof to said piston with the opposite extremities of the ram being located outside of said cylinder, a plurality of conduits disposed in the body of the ram and extending the entire length thereof, a punch secured to each end of the ram, each punch having a hollowed out interior in open communication with all of the said conduits, a first valve means on each side of the piston for placing one of the ram conduits and the hollowed out interiors of the punches in open communication with the piston actuating fluid during reciprocation of the piston to one side of the cylinder whereby fluid can enter the said conduit in the ram from the side of the piston being actuated and a second valve means on each side of the piston and operable at the same time as said first valve means for placing another of the ram conduits and the hollowed out interiors of the punches in communication with the piston actuating fluid on the other side of the cylinder during the said actuation of the ram whereby during reciprocation of the piston and ram to the said one side of the cylinder fluid will be withdrawn from the ram on the other side of the cylinder.

8. In a device for forming cup-shaped bodies from initially flat metallic blanks, the combination of a piston means and a separate punch secured to the opposing sides thereof, a set of drawing dies associated with each punch, each set of drawing dies including a movingly mounted punch bottoming member means for reciprocating said piston means and for moving each of said punches into and out of the set of drawing dies associated therewith, a separate pressure pad for engaging and holding a flat blank against a set of dies during initial movement of the punch therethrough, common means securing all of the opposed punch bottoming members and the opposed pressure pads together whereby movement of the punch connected to one side of the piston means into engagement with the bottoming member on the said one side of said piston means will cause the pressure pad on the other side of the piston means to be moved away from the set of forming dies associated therewith so that a flat blank may be inserted between the pressure pad and the said set of dies and means actuated by said pressure pad for centering the flat blank with respect to said last-mentioned pressure pad and set of dies during removal of the pressure pad away from the set of dies and insertion of the flat blank therebetween.

9. In a device for forming cup-shaped bodies from initially flat metallic blanks, the combination of a piston means and a separate punch secured to the opposite sides thereof, a set of drawing dies disposed on opposite sides of said piston means, each set of dies being adapted to cooperate with a punch to form a cup-shaped body, means for reciprocating said piston and for moving each of said punches into and out of the set of drawing dies associated therewith, a pressure pad associated with each set of dies for engaging and holding a flat blank against a set of dies during initial movement of the punch therethrough, means actuated by the respective punches for moving the pressure pads away from the sets of forming dies associated therewith so that flat blanks may be disposed therebetween and means actuated by a pressure pad for engaging and centering a blank with respect to the said pressure pad and a set of dies during movement of said pressure pad away from the said set of dies.

10. In a device for centering a flat metallic blank with respect to a set of drawing dies, a punch movable into and out of the set of dies and a pressure pad employed to hold the blank against the set of dies during initial movement of a punch therethrough, the combination of a centering arm adapted to engage and exert pressure on said blank when the blank is inserted between the pressure pad and the set of dies, means for first axially moving said arm into a position adjacent the blank, and means for rotating said arm into engagement with the blank, and means actuated by the movement of said pressure pad away from the set of dies for operating said first and second mentioned means and for synchronizing the operation of said first and second mentioned means with the movement of the pressure pad away from the set of dies.

11. In a container body forming apparatus wherein flat metallic blanks are drawn into cup-shaped bodies, the combination of a piston, a punch secured to the opposite sides of said piston, a set of forming dies disposed adjacent each of said punches, means for reciprocating said piston and for moving each of said punches into and out of the set of forming dies associated therewith, a pressure pad associated with each set of dies for engaging and holding a flat blank against the set of dies during initial movement of the punch therethrough, means actuated by the respective punches for moving the pressure pads away from the sets of dies associated therewith so that a flat blank can be disposed therebetween and means including said last-mentioned means and actuated by said punch for controlling the movement of said piston reciprocating means.

12. An apparatus as set forth in claim 11 wherein said means for reciprocating said piston includes means for cooling said punches.

13. An apparatus as set forth in claim 11 including means operated by said piston, reciprocating means for feeding flat blanks to the said sets of forming dies.

14. An apparatus as set forth in claim 11 including means actuated by said pressure pad for centering the blank inserted between a set of dies and a pressure pad with respect to the pressure pad and said set of dies.

15. In a device for forming tubular bodies from flat metallic blanks, the combination of opposed sets of dies, a separate punch means movable into and out of each set of dies, a common piston for actuating said punch means whereby actuation of said piston in either direction will produce a working stroke of one of said punch means, means for actuating said piston, pressure pad means associated with each set of dies and each punch means for holding a flat blank in position adjacent a set of dies during initial movement of a punch means therethrough and means actuated by the punch means on one side of the piston when the punch means on the said one side of the piston is bottomed in the set of dies associated therewith for withdrawing the pressure pad on the other side of said piston away from the set of dies associated therewith to allow a flat blank to be disposed adjacent the said last-mentioned set of dies.

16. In a device of the type set forth in claim 15, means controlled by said piston actuating means for cooling the said punch means.

17. A device of the type set forth in claim 15 including means controlled by said piston actuating means for feeding flat blanks to a set of dies.

18. A device as set forth in claim 15 including means actuated by said pressure pad means for centering a blank with respect to a set of dies during removal of the pressure pad means therefrom.

19. In a workpiece drawing apparatus of the type described and comprising a plurality of aligned and spaced drawing dies having openings of progressively reduced peripheral dimensions with adjacent dies of said plurality of dies being spaced apart such that drawing of the workpiece occurs in only one die at any given time, means for fully supporting the workpiece and a punch and controlling the movements of said workpiece and punch as they pass from one die to the next succeeding die, said means comprising a piloting element located substantially immediately adjacent the exit end of the first die, said piloting element being provided with an opening of a slightly greater peripheral dimension than that of the die with which it is associated, whereby the workpiece including the trailing end thereof will be assured of slidingly engaging the piloting element as it passes therethrough and whereby the workpiece will pass through the piloting element without any drawing of the workpiece being effected by the piloting element.

20. A drawing apparatus comprising the combination of a forming punch and a plurality of axially aligned and spaced dies having openings of progressively reduced peripheral dimensions through which said punch is passed along with a workpiece, adjacent dies of said plurality of dies being spaced apart a distance such that drawing of the workpiece occurs in only one die at any given time and means for controlling the movements of the punch and the workpiece as the punch and workpiece pass from one die to the next succeeding die, said means comprising an apertured piloting element located substantially immediatly adjacent the exit end of the first-mentioned die, the peripheral dimension of the aperture of said piloting element being such that the workpiece and punch will freely pass through the piloting element without any drawing of the workpiece being produced by the piloting element, and said piloting element also being sufficiently spaced from said second-mentioned die whereby the piloting element will slidingly support the trailing end of the workpiece until the forward portion of the workpiece enters said second-mentioned die.

21. A drawing apparatus as set forth in claim 20 wherein said first-mentioned die comprises a cupping die and said second-mentioned die comprises an ironing die.

22. A drawing apparatus as set forth in claim 20 wherein said first and second-mentioned dies both comprise ironing dies.

23. In a drawing apparatus comprised of a punch and a plurality of axially aligned and spaced drawing dies having openings of progressively reduced peripheral dimensions, the improvement comprising means for supporting and controlling the movements of the punch and a workpiece as the punch and workpiece pass from one die to the next succeeding die, adjacent dies of said plurality of dies being spacially arranged such that drawing of the workpiece occurs in only one die at any given time, said means comprising an apertured piloting element located substantially immediately adjacent the exit end of the first die, the peripheral dimension of the aperture of the piloting element being large enough and of such a configuration that it will not produce a drawing of the workpiece, and said piloting element being sufficiently spaced from said second-mentioned die whereby the piloting element will slidingly and fully support the trailing end of the workpiece until the forward portion of the workpiece enters said next succeeding die.

24. An apparatus for fabricating a uniformly thin-walled tubular metal workpiece in a single application of pressure comprising means for controllably advancing the workpiece successively through a series of axially aligned and spaced die orifices of progressively reduced peripheral dimensions, means for effecting a drawing of the workpiece in only one die orifice at any given time and means for slidably and peripherally supporting the side wall of the workpiece substantially immediately after it has been drawn in one of the die orifices to maintain axial alignment of said workpiece with said die orifices and without exerting any drawing of the side wall of the workpiece during passage of the workpiece between adjacent die orifices and for maintaining the slidable and pripheral support of the workpiece until and after the trailing end of the drawn workpiece has completely cleared the first-mentioned die orifice and the forward part thereof has made an initial entrance into an adjacent die orifice and a thinning of the side wall of the workpiece initiated in said adjacent die orifice.

25. An apparatus for fabricating a uniformly thin-walled tubular metal workpiece comprising means for controllably passing said workpiece through a series of axially aligned and spaced die orifices of progressively reduced peripheral dimensions in a single application of pressure to progressively thin the side wall of the workpiece in successive die orifices including means for effecting a drawing of the workpiece in only one die orifice at any given time and means for merely slidably and peripherally supporting the side wall of the workpiece including the trailing end thereof to effect and maintain axial alignment between the workpiece and the axes of said die orifices as the workpiece is passed from one die orifice to the next succeeding die orifice, the maintenance of said axial alignment between the workpiece and die orifices during passage of the workpiece between said die orifices being effected at all times without exerting any ironing elongation and thinning of the side wall of the workpiece.

26. An apparatus for fabricating a thin-walled, cup-shaped metal workpiece comprising means for passing the workpiece through successive axially aligned and spaced die orifices of progressively reduced peripheral dimensions including means for effecting a drawing of the workpiece in only one die orifice at any given time and means for slidably and peripherally supporting the side wall of the workpiece during controlled passage of the workpiece between a pair of die orifices without exerting any drawing pressure thereon and for maintaining the slidable and peripheral support of the workpiece until and after the trailing end of the workpiece has completely cleared one die orifice and the forward peripheral portion of the workpiece has been partially advanced through and is supported by the adjacent die orifice of said pair of orifices.

References Cited in the file of this patent

UNITED STATES PATENTS

| | | |
|---|---|---|
| 538,656 | Butters | May 7, 1895 |
| 1,196,676 | Gray | Aug. 29, 1916 |
| 1,341,721 | Opitz | June 1, 1920 |
| 2,041,516 | Rudd | May 19, 1936 |
| 2,261,060 | Giesler | Oct. 28, 1941 |
| 2,289,199 | Klocke | July 7, 1942 |
| 2,373,606 | Slater | Apr. 10, 1945 |
| 2,377,097 | Norris | May 29, 1945 |
| 2,387,766 | Moore | Oct. 30, 1945 |
| 2,411,082 | Conti | Nov. 12, 1946 |
| 2,577,084 | Laxo | Dec. 4, 1951 |
| 2,602,539 | See | July 8, 1952 |
| 2,679,816 | Moore | June 1, 1954 |
| 2,776,475 | Mapes | Jan. 8, 1957 |

FOREIGN PATENTS

| | | |
|---|---|---|
| 486,260 | Great Britain | June 1, 1938 |
| 625,011 | Great Britain | June 21, 1949 |
| 724,251 | Great Britain | Feb. 16, 1955 |
| 154,256 | Germany | Sept. 20, 1904 |
| 901,726 | Germany | July 8, 1949 |

UNITED STATES PATENT OFFICE
CERTIFICATE OF CORRECTION

Patent No. 3,167,044　　　　　　　　　　　　　　January 26, 1965

Henry G. Henrickson

It is hereby certified that error appears in the above numbered patent requiring correction and that the said Letters Patent should read as corrected below.

Column 1, line 44, after "several" insert -- forming --; column 4, line 47, strike out "the", first occurrence; column 9, line 28, for "is" read -- in --; line 44, strike out "The"; column 15, line 60, for "important" read -- importance --; column 22, line 44, for "past" read -- said --; line 75, for "condits" read -- conduits --.

Signed and sealed this 27th day of July 1965.

(SEAL)
Attest:

ERNEST W. SWIDER　　　　　　　　　　　　　　EDWARD J. BRENNER
Attesting Officer　　　　　　　　　　　　　　Commissioner of Patents